(12) United States Patent
Bansal et al.

(10) Patent No.: US 10,580,302 B2
(45) Date of Patent: Mar. 3, 2020

(54) OPTIMIZATION OF A MOTION PROFILE FOR A VEHICLE

(71) Applicant: TOYOTA JIDOSHA KABUSHIKI KAISHA, Toyota-shi, Aichi-ken (JP)

(72) Inventors: Gaurav Bansal, Mountain View, CA (US); Hongsheng Lu, Mountain View, CA (US); John Kenney, Mountain View, CA (US)

( * ) Notice: Subject to any disclaimer, the term of this patent is extended or adjusted under 35 U.S.C. 154(b) by 49 days.

(21) Appl. No.: 15/640,352

(22) Filed: Jun. 30, 2017

(65) Prior Publication Data

US 2019/0005820 A1    Jan. 3, 2019

(51) Int. Cl.
G08G 1/16 (2006.01)
B60W 30/16 (2020.01)
G01S 19/42 (2010.01)

(52) U.S. Cl.
CPC .............. *G08G 1/166* (2013.01); *B60W 30/16* (2013.01); *G08G 1/161* (2013.01); *G08G 1/163* (2013.01); *G08G 1/165* (2013.01); *G01S 19/42* (2013.01)

(58) Field of Classification Search
CPC ........ G08G 1/166; G08G 1/165; G08G 1/161; B60W 30/16; G01S 19/42
See application file for complete search history.

(56) References Cited

U.S. PATENT DOCUMENTS

| 8,509,982 | B2 | 8/2013 | Montemerlo et al. |
| 9,505,412 | B2 | 11/2016 | Bai et al. |
| 9,786,178 | B1 | 10/2017 | Bai et al. |
| 9,805,592 | B2 | 10/2017 | Ibrahim et al. |
| 10,080,124 | B2 | 9/2018 | Tan et al. |
| 2015/0202770 | A1* | 7/2015 | Patron ............... G05D 1/024 700/245 |
| 2016/0049079 | A1* | 2/2016 | Ibrahim ............ G08G 1/005 340/944 |
| 2018/0096605 | A1* | 4/2018 | Bai ................... G08G 1/166 |
| 2018/0328752 | A1 | 11/2018 | Tomatsu et al. |
| 2019/0011925 | A1 | 1/2019 | Bansal et al. |

FOREIGN PATENT DOCUMENTS

| JP | PO2008-217429 | 9/2008 |
| JP | PO2015-109003 | 6/2015 |

OTHER PUBLICATIONS

USPTO, Non-final Office Action for U.S. Appl. No. 15/644,188, dated Dec. 6, 2018, 16 pages.

* cited by examiner

*Primary Examiner* — Yuen Wong
(74) *Attorney, Agent, or Firm* — Burbage Law, P.C.; Jon-Michael Burbage; Elizabeth Ruzich

(57) ABSTRACT

The disclosure includes embodiments for optimizing a motion profile of a vehicle. A method includes, according to some embodiments, receiving, by a first dedicated short range communication (DSRC) chip of a DSRC-enabled vehicle, a pedestrian safety message (a PSM message) including pedestrian safety message data (PSM data) describing a relationship of a pedestrian to a roadway infrastructure that includes the DSRC-enabled vehicle. The method includes the PSM message being broadcast by a DSRC-enabled device that includes a second DSRC chip that is operable to broadcast the PSM message via DSRC. In some embodiments, the DSRC-enabled device is carried by the pedestrian described by the PSM data.

19 Claims, 10 Drawing Sheets

PSM DATA 195

Part 1

GPS Data for the DSRC-enabled device (local 3D)
- Latitude for the DSRC-enabled device substantially at the time when the PSM message is transmitted
- Longitude for the DSRC-enabled device substantially at the time when the PSM message is transmitted
- Elevation for the DSRC-enabled device substantially at the time when the PSM message is transmitted
- Positional accuracy for the latitude, longitude and elevation information
- Day and time when the latitude, longitude and elevation information where determined Path History Data for the DSRC-enabled device
- Historical GPS Data including all the information described above for past times

Part 2
- Path prediction for a pedestrian over a specified time frame or distance
- Group size for the pedestrian (e.g., how many pedestrians are traveling together as a group based on head count?)
- Group radius for the pedestrian (e.g., for a group of pedestrians traveling together, how big is the radius of the group as they walk together? Groups that are less densely packed together will have a bigger radius. Groups that are more densely packed together will have a smaller radius. Groups with more people by headcount will tend to have a larger radius. Groups that have less people by headcount will tend to have a smaller radius.)
- Estimate of whether the pedestrian is pushing a stroller
- Estimate of whether the pedestrian has intent to cross a roadway
- Whether the pedestrian is currently crossing a roadway
- Estimate of whether the pedestrian is traveling with an animal and the type of animal with the pedestrian
- Estimate of the non-vehicular means of propulsion of the pedestrian (e.g., bike, scooter, skateboard, etc)

Figure 1B

OPTIMIZATION OF A MOTION PROFILE FOR A VEHICLE

BACKGROUND

The specification relates to optimization of a motion profile for a vehicle.

Vehicle control systems are becoming increasingly popular. One example of a vehicle control system is an Advanced Driver Assistance System ("ADAS system" if singular, "ADAS systems" if plural).

ADAS systems provide one or more autonomous features to the vehicles which include these ADAS systems. For example, an ADAS system may monitor the position of a vehicle relative to the lane in which the vehicle is traveling, and if the vehicle begins to swerve outside of that lane the ADAS system may take remedial action by repositioning the vehicle so that the vehicle stays in the lane or providing a notification to a driver of the vehicle so that the driver knows that they need to take action to remedy the situation.

Some vehicles include a sufficient number and quality of autonomous features that they are considered to be autonomous vehicles.

Autonomous vehicles cannot handle all traffic situations without their drivers intervening to assist them. There are also some traffic situations that have qualities such that drivers do not trust their autonomous vehicles to handle these traffic situations. Both of these are categories of traffic situations which require that drivers provide their attention to the roadway and intervene in the operation of their autonomous vehicles using their knowledge of the current traffic situation.

SUMMARY

The Dedicated Short Range Communication ("DSRC") standard specifies the requirements for a vehicle to be a "DSRC-enabled vehicle." For example, a DSRC-enabled vehicle is any type of connected vehicle including a DSRC chip, a DSRC-compliant GPS unit and any other hardware or software which is necessary to comply with the DSRC standard as applied to vehicles.

The DSRC standard also specifies the requirements for an electronic device which is not a vehicle to be a "DSRC-enabled device." For example, a DSRC-enabled device is any type of processor-based computing device which is not a vehicle and includes a DSRC chip, a DSRC-compliant GPS unit and any other hardware or software which is necessary to comply with the DSRC standard as applied to non-vehicular devices. In some embodiments, one or more of the following are a DSRC-enabled device if they include a DSRC chip: a smartphone; a tablet computer; a laptop; a smartwatch; a fitness band; etc.

In some embodiments, a DSRC-enabled device is carried by a pedestrian. A pedestrian includes a human that is located in a roadway environment or proximate to a roadway.

In some embodiments, a DSRC-enabled device broadcasts or unicasts one or more Pedestrian Safety Messages ("PSM message" if singular, "PMS messages" if plural). A PSM message includes PSM data (see, e.g., FIG. 1B).

In some embodiments, a PSM message is transmitted by a DSRC-enabled device when the DSRC-enabled device is located in a roadway environment or proximate to a roadway (e.g., within 500 meters of a roadway, which corresponds to the transmission range of PSM messages based on the requirements of the DSRC standard). Over a period of time, the PSM data aggregated from a plurality of PSM messages for a specific geographic location on different days and times are analyzed to determine the characteristic behavior of the pedestrians located at that specific geographic location at different days of the week and different times of the day.

In some embodiments, a DSRC-enabled vehicle includes a set of ADAS systems. The set of ADAS systems control the motion profile of the DSRC-enabled vehicle. A set of ADAS systems may be referred to herein as an "ADAS system set." See, e.g., the ADAS system set 180 depicted in FIG. 1A.

A design time includes formation or modification of an aggregated PSM data structure and an electronic roadway map including or associated with characteristic behavior data for different geographic locations determined based on PSM data. The design time is now described according to some embodiments. In some embodiments, a plurality of DSRC-enabled devices broadcast a plurality of PSM messages for one or more geographic locations. For example, a plurality of pedestrians have their DSRC-enabled smartphones and these DSRC-enabled smartphones repeatedly broadcast PSM messages at a regular interval so long as the DSRC-enabled smartphones are within 500 meters of a roadway, which is the transmission range for PSM messages based on the DSRC standard. The DSRC-enabled vehicle receives the plurality of PSM messages. The DSRC-enabled vehicle includes an optimization client which extracts the PSM data from the plurality of PSM messages and stores the PSM data in a non-transitory memory of the DSRC-enabled vehicle. The optimization client then causes a communication unit of the DSRC-enabled vehicle to transmit a wireless message to a server via a wireless network. The wireless message includes the PSM data which is stored in the non-transitory memory of the DSRC-enabled vehicle. The server includes an optimization system. The optimization system aggregates PSM data received from many different DSRC-enabled vehicles to form an aggregated PSM data structure. The aggregated PSM data structure includes PSM data for many different geographic locations at many different times of day. The optimization system analyzes the PSM data stored in the aggregated PSM data structure to determine characteristic behavior data that describes the characteristic behavior of pedestrians at different geographic locations for different days of the week and times of the day. The optimization system builds the characteristic behavior data so that each combination of (1) geographic location, (2) day of week and (3) time of day has its own instance of characteristic behavior data. In this way the characteristic behavior of pedestrians at a plurality of geographic locations can be identified and known for different days of the week and different times of the day. The optimization system stores the characteristic behavior data in a non-transitory memory of the server. The non-transitory memory of the server also stores an electronic roadway map. The electronic roadway map describes different geographic locations within a geographic area. The electronic roadway map is operable so that each geographic location included in the electronic roadway map can be associated with different instances of characteristic behavior data for different days of the week and different times of the day. The optimization system associates the characteristic behavior data with the corresponding geographic locations included in the electronic roadway map such that electronic roadway map describes: (1) different geographic locations; and (2) for some or all of these geographic locations, characteristic behavior data which is determinable based on the PSM data which is stored in the aggregated PSM data structure. In this way the optimization system beneficially communicates with a plurality of optimization clients included in a plurality of different DSRC-enabled vehicles to form an aggregated PSM data structure and an electronic roadway map including characteristic behavior data for different geographic locations at different days of the week and different times of the day. This process is repeated as new characteristic behavior data is determined by the optimization system responsive to the optimization system receiving new PSM data, which is then stored by the optimization system in the aggregated PSM data structure, so that the characteristic behavior data included in the electronic roadway map is increased or modified based on the newly received PSM data. In this way the optimization system beneficially communicates with a plurality of optimization clients included in a plurality of different DSRC-enabled vehicles to increase or modify the PSM data included in the aggregated PSM data structure and the characteristic behavior data included in the electronic roadway map.

A runtime includes modification of a motion profile of a DSRC-enabled vehicle (or, in some embodiments, a connected vehicle which is not DSRC-enabled) based on the characteristic behavior data for the geographic location where the DSRC-enabled vehicle (or, in some embodiments, the connected vehicle which is not DSRC-enabled) is located at a particular day of the week and time of the day. The runtime is now described according to some embodiments. For the purpose of clarity, the description of the runtime refers to the DSRC-enabled vehicle and not the connected vehicle which is not necessarily DSRC-enabled. However, it will be understood that the DSRC-enabled vehicle can, in some embodiments, be replaced by a connected vehicle which is not DSRC-enabled but still includes a communication unit that enables it to send and receive wireless messages (such as those that include the optimization query and the optimization data) via the wireless network.

The optimization client of the DSRC-enabled vehicle calls the DSRC-compliant GPS unit of the DSRC-enabled vehicle to receive GPS data describing: (1) the current time of day; (2) the current day of the week; and (3) the current geographic location of the DSRC-enabled vehicle. The optimization client calls the set of ADAS systems of the DSRC-enabled vehicle to request the ADAS identifiers for the set of ADAS systems of the DSRC-enabled vehicle. An ADAS identifier is digital data that identifies an ADAS system. Each ADAS system includes its own ADAS identifier. The set of ADAS systems of the DSRC-enabled vehicle control the operation of the DSRC-enabled vehicle, and so, the set of ADAS systems control the motion profile of the DSRC-enabled vehicle. The optimization client generates an optimization query. The optimization query is a wireless message that requests optimization data from the server, and includes digital data describing: (1) the current time of day; (2) the current day of the week; (3) the current geographic location of the DSRC-enabled vehicle; and (4) a set of ADAS identifiers for the set of ADAS systems of the DSRC-enabled vehicle. The optimization client of a DSRC-enabled vehicle causes a communication unit of the DSRC-enabled vehicle to transmit the optimization query to the server via a wireless network. A communication unit of the server receives the optimization query from the wireless network. The communication unit of the server transmits the optimization query to the optimization system as an input to the optimization system. The optimization system analyzes the optimization query to determine the current time of day, day of week and geographic location of the DSRC-enabled vehicle. The optimization system retrieves the characteristic behavior data for this particular time of day, day of week and geographic location. The optimization system includes access to an ADAS parameter data structure that includes ADAS parameter data that describes the various settings available for different ADAS systems which can be configured so that the ADAS system controls the operation of a vehicle in a manner that is consistent with a motion profile determined to be safe by the optimization system based on the character behavior data retrieved by the optimization system. The ADAS parameter data structure is indexed based on different ADAS identifiers so that ADAS parameters for different ADAS systems are capable of retrieval from the ADAS parameter data structure based on different ADAS identifiers included in different optimization queries. The optimization system queries the ADAS parameter data structure using the an ADAS identifier included in the optimization query and the ADAS parameter data structure responds to this query with a set of parameters for the ADAS system associated with the particular ADAS identifier included in the query; this process of querying the ADAS parameter data structure with an ADAS identifier is either (1) repeated serially for each individual ADAS identifier included in the optimization query or (2) completed as a batch if the ADAS parameter data structure is operable to receive a batch of ADAS identifiers as a batch query and respond to the batch query with sets of parameters for the ADAS systems associated with the ADAS identifiers included in the batch query. In this way, the optimization system beneficially acquires knowledge about which ADAS parameters of the DSRC-enabled vehicle are configurable based on the characteristic behavior data. The optimization system determines optimization data which describes modifications for the settings of the ADAS parameters for the ADAS systems included in the ADAS system set of the DSRC-enabled vehicle that will cause the ADAS system set to operate the DSRC-enabled vehicle with a motion profile that is consistent with the characteristic behavior data for the particular geographic location of the DSRC-enabled vehicle at this particular time of day and day of week. The optimization system causes the communication unit of the server to transmit a response message to the DSRC-enabled vehicle via the wireless network. The response message includes the optimization data. The communication unit of the DSRC-enabled vehicle receives the optimization data from the network and transmits the optimization data to the optimization client or stores the optimization data in the non-transitory memory of the DSRC-enabled vehicle. The optimization client modifies the settings of the ADAS parameters for the set of ADAS systems to be consistent with the parameters described by the optimization data, thereby modifying the motion profile of the DSRC-enabled vehicle to be consistent with the characteristic behavior data for the geographic location where the DSRC-enabled vehicle is located at this particular day of the week and time of the day.

In some embodiments, the DSRC-enabled vehicle is an autonomous vehicle. The National Highway Traffic Safety Administration ("NHTSA") has defined different "levels" of autonomous vehicles, e.g., Level 0, Level 1, Level 2, Level 3, Level 4 and Level 5. If a DSRC-enabled vehicle has a higher level number than another DSRC-enabled vehicle (e.g., Level 3 is a higher level number than Levels 2 or 1), then the DSRC-enabled vehicle with a higher level number offers a greater combination and quantity of autonomous features relative to the DSRC-enabled vehicle with the lower level number. The different levels of autonomous vehicles are described briefly below.

Level 0: The set of ADAS systems installed in the DSRC-enabled vehicle have no vehicle control, but may issue warnings to the driver of the DSRC-enabled vehicle.

Level 1: The driver must be ready to take control of the DSRC-enabled vehicle at any time. The set of ADAS systems installed in the DSRC-enabled vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the DSRC-enabled vehicle fail to respond properly (based on the driver's subjective judgement). The set of ADAS systems installed in the DSRC-enabled vehicle executes accelerating, braking, and steering. The set of ADAS systems installed in the DSRC-enabled vehicle can deactivate immediately upon takeover by the driver.

Level 3: Within known, limited environments (such as freeways), the driver can safely turn their attention away from driving tasks, but must still be prepared to take control of the DSRC-enabled vehicle when needed.

Level 4: The set of ADAS systems installed in the DSRC-enabled vehicle can control the DSRC-enabled vehicle in all but a few environments such as severe weather. The driver must enable the automated system (which is comprised of the set of ADAS systems installed in the DSRC-enabled vehicle) only when it is safe to do so. When the automated system is enabled, driver attention is not required for the DSRC-enabled vehicle to operate safely and consistent with accepted norms.

Level 5: Other than setting the destination and starting the system, no human intervention is required. The automated system can drive to any location where it is legal to drive and make its own decision (which may vary based on the jurisdiction where the DSRC-enabled vehicle is located).

In some embodiments, the DSRC-enabled vehicle is a Highly Autonomous Vehicle ("HAV" if singular, or "HAVs" if plural). An HAV is a DSRC-enabled vehicle that includes a set of ADAS systems that operate at Level 3 or higher as described and above, or as defined by the NHTSA on page 9 of their policy paper entitled "Federal Automated Vehicles Policy: Accelerating the Next Revolution in Roadway Safety," which was published in September of 2016.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving, by a first DSRC chip of DSRC-enabled vehicle, a PSM message including PSM data describing a relationship of a pedestrian to a roadway infrastructure that includes the DSRC-enabled vehicle; and where the PSM message is broadcast by a DSRC-enabled device which is carried by the pedestrian and includes a second DSRC chip that is operable to broadcast the PSM message via DSRC. Other embodiments of this aspect include corresponding computer systems, apparatus, and computer programs recorded on one or more computer storage devices, each configured to perform the actions of the methods.

Implementations may include one or more of the following features. The method further including the DSRC-enabled vehicle wirelessly transmitting the PSM data to a server which determines characteristic behavior data describing a typical behavior of pedestrians at a geographic location where the PSM message was broadcast based on the PSM data. The method where a vehicle which is different than the DSRC-enabled vehicle is proximate to the geographic location where the PSM message was broadcast, further including the vehicle receiving optimization data describing one or more modifications for an ADAS system of the vehicle which are determined based on the characteristic behavior data and the vehicle modifying one or more parameters of the ADAS system based on the optimization data so that operation of the ADAS system causes the vehicle to operate in a manner that is safe based on the typical behavior of pedestrians at the geographic location where the vehicle is located. The method where the vehicle is an automated vehicle. The method where the vehicle is a highly autonomous vehicle. The method where the DSRC-enabled vehicle is an automated vehicle. The method where the DSRC-enabled vehicle is a HAV. Implementations of the described techniques may include hardware, a method or process, or computer software on a computer-accessible medium.

One general aspect includes a system including: a processor and a DSRC chip of a DSRC-enabled vehicle communicatively coupled to a non-transitory memory storing executable code which is operable, when executed by the processor, to cause the processor to: receive, by the first DSRC chip of the DSRC-enabled vehicle, a PSM message including PSM data describing a relationship of a pedestrian to a roadway infrastructure; and where the PSM message is broadcast by a DSRC-enabled device which is carried by the pedestrian and includes a second DSRC chip which is operable to broadcast the PSM message. Other embodiments of this aspect include corresponding computer systems, apparatus, and computer programs recorded on one or more computer storage devices, each configured to perform the actions of the methods.

Implementations may include one or more of the following features. The system where the processor is an element of an engine control unit. The system where the processor is an element of an onboard vehicle computer system. The system further including the DSRC-enabled vehicle wirelessly transmitting the PSM data to a server which determines characteristic behavior data describing a typical behavior of pedestrians at a geographic location where the PSM message was broadcast based on the PSM data. The system where a vehicle which is different than the DSRC-enabled vehicle is proximate to the geographic location where the PSM message was broadcast and the vehicle receives optimization data describing one or more modifications for an ADAS system of the vehicle which are determined based on the characteristic behavior data and the vehicle modifies one or more parameters of the ADAS system based on the optimization data so that operation of the ADAS system causes the vehicle to operate in a manner that is safe based on the typical behavior of pedestrians at the geographic location where the vehicle is located. The system where the vehicle is an automated vehicle. Implementations of the described techniques may include hardware, a method or process, or computer software on a computer-accessible medium.

One general aspect includes a computer program product including a non-transitory memory of an onboard vehicle computer system of a DSRC-enabled vehicle storing computer-executable code that, when executed by the onboard vehicle computer system, causes the onboard vehicle computer system to: receive, by a first DSRC chip of the DSRC-enabled vehicle, a PSM message including PSM data describing a relationship of a pedestrian to a roadway infrastructure; and where the PSM message is broadcast by a DSRC-enabled device which is carried by the pedestrian and includes a second DSRC chip which is operable to broadcast the PSM message. Other embodiments of this aspect include corresponding computer systems, apparatus, and computer programs recorded on one or more computer storage devices, each configured to perform the actions of the methods.

Implementations may include one or more of the following features. The computer program product where the DSRC-enabled vehicle is an autonomous vehicle. The computer program product where the DSRC-enabled vehicle is a highly autonomous vehicle. The method where and the PSM data is a payload of a PSM message broadcast by a DSRC chip while the DSRC chip is present at the geographic location. Implementations of the described techniques may include hardware, a method or process, or computer software on a computer-accessible medium.

One general aspect includes a method including an autonomous vehicle executing steps including: receiving optimization data describing one or more modifications for an ADAS system of the autonomous vehicle while the autonomous vehicle is proximate to a geographic location, where the optimization data is determined based on PSM data describing a behavior of one or more pedestrians while the one or more pedestrians are present at the geographic location; and modifying, while the autonomous vehicle is proximate to the geographic location, one or more parameters of the ADAS system based on the optimization data so that operation of the ADAS system causes the autonomous vehicle to operate in a manner that is safe based on the behavior of the one or more pedestrians while present at the geographic location. Other embodiments of this aspect include corresponding computer systems, apparatus, and computer programs recorded on one or more computer storage devices, each configured to perform the actions of the methods.

Implementations may include one or more of the following features. The method where and the PSM data is a payload of a PSM message broadcast by a DSRC chip while the DSRC chip is present at the geographic location. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1B is a block diagram illustrating an example of PSM data according to some embodiments.

DETAILED DESCRIPTION

Figure 1A:
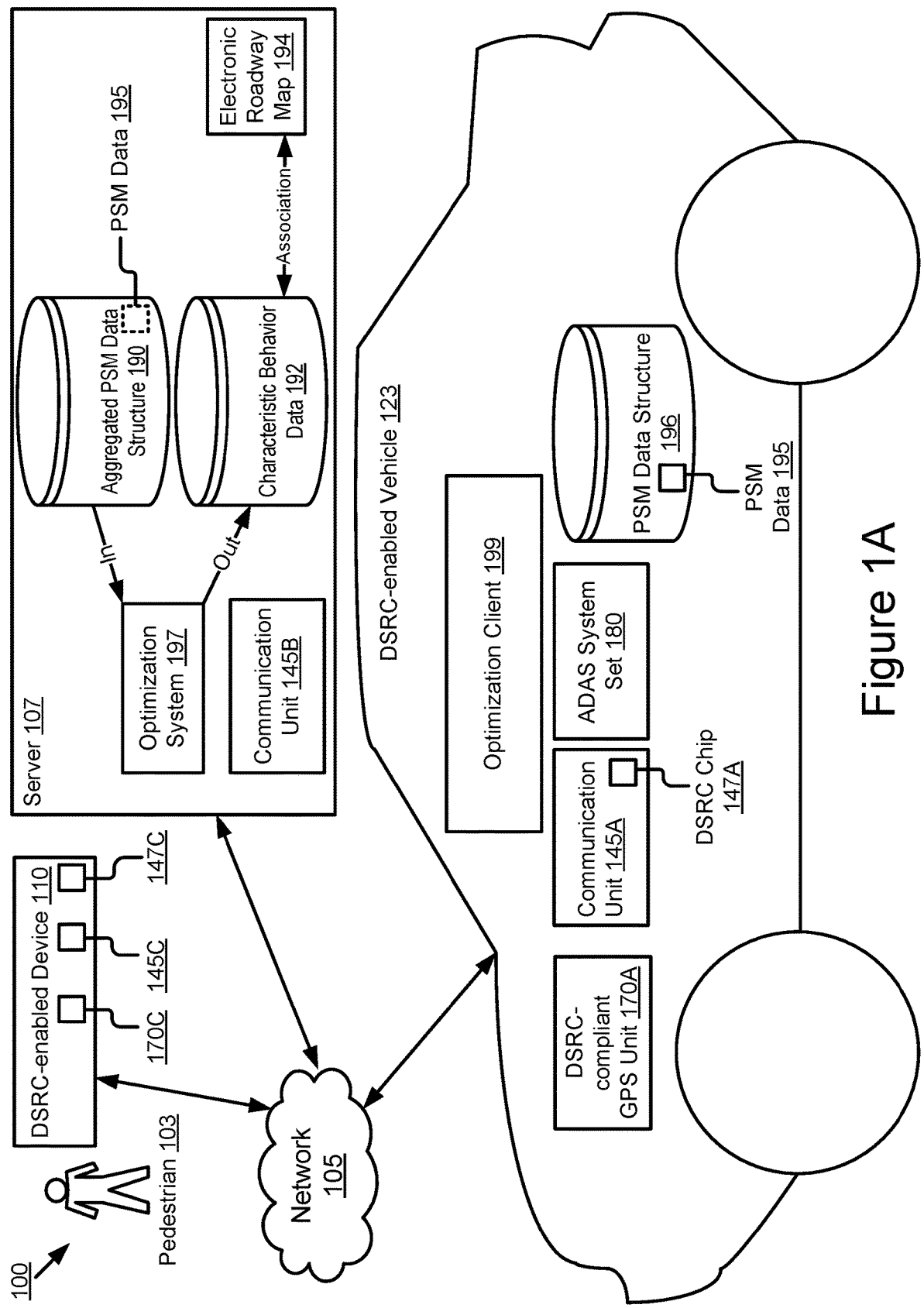
FIG. 1A is a block diagram illustrating an operating environment for an optimization client and an optimization system at a design time according to some embodiments.

Described herein are embodiments of the optimization system and the optimization client. The optimization system is an element of a server. The optimization client is an element of DSRC-enabled vehicle. The DSRC-enabled vehicle may be an autonomous vehicle. For example, the DSRC-enabled vehicle may be one of the following: a Level 1 autonomous vehicle; a Level 2 autonomous vehicle; a Level 3 autonomous vehicle; a Level 4 autonomous vehicle; and a Level 5 autonomous vehicle. The DSRC-enabled vehicle may be an HAV.

A DSRC-enabled device is a processor-based mobile computing device that includes a DSRC chip and a communication unit, and is operable to transmit PSM messages at regular intervals. Each PSM message includes PSM data (see, e.g., FIG. 1B).

In some embodiments, the DSRC-enabled device only transmits a PSM message if it is within 500 meters of a roadway. The DSRC-enabled device determines that it is within 500 meters of the roadway based on the geographic location of the DSRC-enabled device which is determined using a DSRC-compliant GPS unit which is also an element of the DSRC-enabled device in some embodiments.

In another embodiment, the DSRC-enabled device includes data describing geographic locations for different businesses or locations, and the DSRC-enabled device only transmits a PSM message when the DSRC-enabled device is within one of these businesses or locations based on the GPS data provided by the DSRC-compliant GPS unit included in the DSRC-enabled device.

A DSRC-enabled vehicle is a connected vehicle that includes the DSRC chip and the DSRC-compliant GPS unit. A DSRC-enabled device is not a DSRC-enabled vehicle because a DSRC-enabled device is not a vehicle. The DSRC chip and the DSRC-compliant GPS unit included in each of the DSRC-enabled vehicle and the DSRC-enabled device are similar to one another but may vary based on size since a DSRC-enabled vehicle is generally bigger than a DSRC chip, and so, cost savings may be achieved by making these components of the DSRC-enabled vehicle bigger than those of the DSRC-enabled device.

In some embodiments, a DSRC chip is an electronic hardware device that includes: (1) a DSRC transmitter that is operable to transmit DSRC messages; (2) a DSRC receiver that is operable to receive DSRC messages; and (3) any other hardware or software that is necessary for the DSRC-enabled vehicle or the DSRC-enabled device to comply with the DSRC standard. It will be understood to those having ordinary skill in the art that a device which is merely able to transmit and receive cellular communications, Wi-Fi communications or millimeter wave communications is not a DSRC chip, or otherwise "DSRC-enabled," because such devices are not built for mobility and do not comply with the DSRC standard, and as such, are not able to transmit or receive DSRC messages.

In some embodiments, the DSRC-compliant GPS unit includes hardware that wirelessly communicates with a GPS satellite to retrieve positional data (herein, GPS data or DSRC-compliant GPS data) that describes a location of the DSRC-enabled vehicle or the DSRC-enabled device, as the case may be, with a precision that is compliant with the DSRC standard. The DSRC standard requires that positional data be accurate to within plus or minus 1.5 meters at least 68% of the time when the DSRC-compliant GPS unit is under an open sky. For example, the DSRC standard requires that positional information generated by the DSRC-compliant GPS unit be precise enough to infer if two vehicles (one of which is, for example, the DSRC-enabled vehicle depicted in FIGS. 1A and 1C) are in the same lane at the same time. The lane may be a lane of a roadway. The DSRC-compliant GPS unit is operable to identify, monitor and track its two-dimensional position within 1.5 meters of its actual position 68% of the time under an open sky. Since lanes of a roadway are typically no less than 3 meters wide, the positional information generated by the DSRC-compliant GPS unit describes it's position (as well as the position of the DSRC-enabled vehicle or DSRC-enabled device which includes the DSRC-compliant GPS unit) with lane-level accuracy.

By comparison, a conventional GPS unit which is not compliant with the DSRC standard is unable to determine positional information with lane-level accuracy. For example, a typical lane of a roadway is approximately 3 meters wide. However, a conventional GPS unit only has an accuracy of plus or minus 10 meters relative to the actual location of the conventional GPS unit. As a result, such conventional GPS units are not sufficiently accurate for use by the optimization client or the optimization system because doing so would generate characteristic behavior data that is erroneous in terms of the geographic locations it describes, which would eventual result in a vehicle traveling with an inappropriate motion profile relative to its current location of travel, which might cause death or injury for pedestrians which are in the vicinity of the vehicle.

In some embodiments, the DSRC standard is described in one or more of the following standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

Referring to FIG. 1A, depicted is a block diagram illustrating an operating environment 100 for an optimization client 199 and an optimization system 197 at a design time according to some embodiments. In some embodiments, the design time includes formation or modification of an aggregated PSM data structure 190 and an electronic roadway map 194 including or associated with characteristic behavior data 192 for different geographic locations determined based on PSM data 195 included in the aggregated PSM data structure 190.

The operating environment 100 may include one or more of the DSRC-enabled vehicle 123, a server 107 and a DSRC-enabled device 110. These elements may be communicatively coupled to one another via a network 105. Although one DSRC-enabled vehicle 123, one server 107, one DSRC-enabled device 110 and one network 105 are depicted in FIG. 1A, in practice the operating environment 100 may include one or more DSRC-enabled vehicles 123, one or more servers 107, one or more DSRC-enabled devices 110 and one or more networks 105. The operating environment 100 may also include a pedestrian 103. In some embodiments, a pedestrian 103 includes a human that is located in a roadway environment or proximate to a roadway.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. The network 105 includes a DSRC network operable to transmit or broadcast DSRC messages, including PSM messages. In some embodiments, a PSM message is a DSRC message that is broadcast (instead of unicast) and whose payload consists of PSM data 195. In other words, the payload of the PSM message includes only PSM data 195 and no other payload.

In some embodiments, the network 105 is a full-duplex network operable to send full-duplex wireless communications. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

The network 105 may include one or more communication channels shared among the DSRC-enabled vehicle 123, the server 107 and the DSRC-enabled device 110. The communication channel may include one or more of DSRC, LTE vehicle to everything (V2X), full-duplex wireless communication or any other wireless communication protocol. For example, the network 105 may be used by the DSRC-enabled device 110 to broadcast a PSM message which is received by the DSRC-enabled vehicle 123. In another example, the network 105 is used by the DSRC-enabled vehicle 123 to transmit a wireless message including PSM data 195 to the server 107. In yet another example, the DSRC-enabled vehicle 123 uses the network 105 to transmit a wireless message including an optimization query to the server 107 (see, e.g., FIG. 1C). In another example, the server 107 uses the network 105 to transmit a wireless message including optimization data to the DSRC-enabled vehicle 123 (see, e.g., FIG. 1C).

The DSRC-enabled vehicle 123 is any type of connected vehicle including a DSRC chip 147A, a DSRC-compliant GPS unit 170, an ADAS system set 180 and any other hardware or software which is necessary to comply with the DSRC standard as applied to vehicles. For example, the DSRC-enabled vehicle 123 is one of the following types of DSRC-enabled vehicles 123: a car; a truck; a sports utility vehicle; a bus; a semi-truck; a drone or any other roadway-based conveyance. The DSRC-enabled vehicle 123 includes any hardware or software necessary to send and receive wireless messages via the network 105.

Figure 2A:
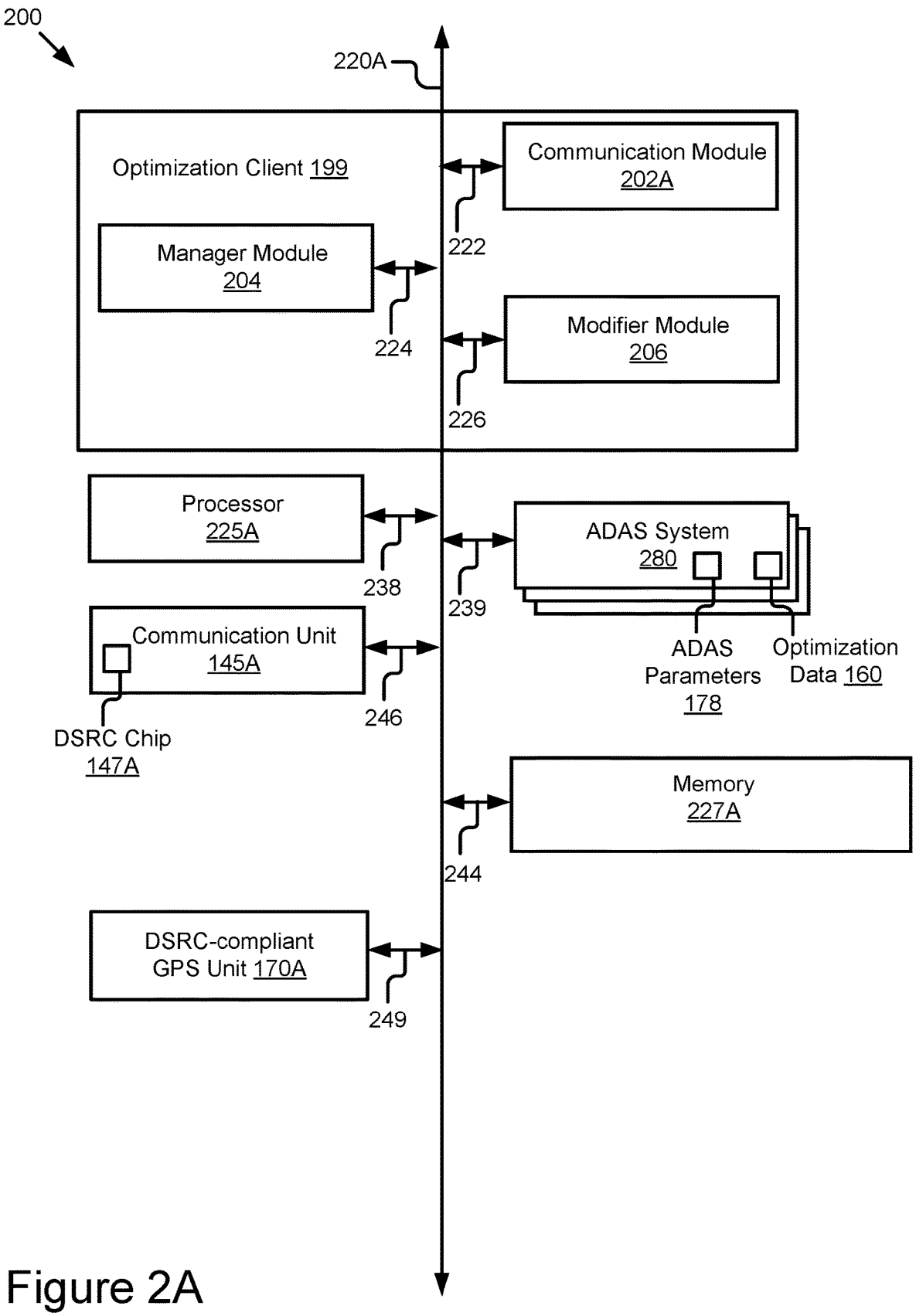
FIG. 2A is a block diagram illustrating an example computer system including the optimization client according to some embodiments.

In some embodiments, the DSRC-enabled vehicle 123 is an autonomous vehicle. For example, the DSRC-enabled vehicle 123 is one of the following: a Level 1 autonomous vehicle; a Level 2 autonomous vehicle; a Level 3 autonomous vehicle; a Level 4 autonomous vehicle; and a Level 5 autonomous vehicle. In some embodiments, the DSRC-enabled vehicle 123 is an HAV. An HAV is an autonomous vehicle whose ADAS system set 180 provides autonomous functionality sufficient to operate at Level 3 or greater. An example of an onboard vehicle computer for the DSRC-enabled vehicle 123 is depicted in FIG. 2A according to some embodiments.

The server 107 is a processor-based computing device. For example, the server 107 may include one or more of the following types of processor-based computing devices: a personal computer; a laptop; a mainframe; or any other processor-based computing device that is operable to function as a server. The server 107 may include a hardware server. The server 107 includes any hardware or software necessary to send and receive wireless messages via the network 105.

The DSRC-enabled device 110 is a processor-based mobile computing device including a DSRC chip 147C and any other hardware or software which is necessary to comply with the DSRC standard as applied to mobile computing devices which are not vehicles or conveyances. For example, the DSRC-enabled device 110 may include one or more of the following types of processor-based computing devices so long as these devices also include a DSRC chip 147C and any other hardware or software which is necessary to comply with the DSRC standard: a smartphone; a smartwatch; an augmented reality viewing device (e.g., augmented reality goggles or glasses); a tablet computer; an electronic book reader; a personal computer; a laptop; and any other processor-based device that is operable to function as mobile computing device. The DSRC-enabled device 110 includes any hardware or software necessary to send and receive wireless messages via the network 105.

In some embodiments, the DSRC-enabled vehicle 123 includes one or more of the following elements: a communication unit 145A; a DSRC chip 147A; a DSRC-compliant GPS unit 170A; the ADAS system set 180; a PSM data structure 196; and the optimization client 199.

In some embodiments, the server 107 includes one or more of the following elements: a communication unit 145B; a DSRC chip 147B; an aggregated PSM data structure 190; characteristic behavior data 192; and the optimization system 197.

In some embodiments, the DSRC-enabled device 110 includes: a communication unit 145C; a DSRC chip 147C; and a DSRC-compliant GPS unit 170C.

The communication unit 145A, the communication unit 145B and the communication unit 145C are referred to herein individually or collectively as "the communication unit 145." For example, the communication unit 145A may be referred to herein as "the communication unit 145 of the DSRC-enabled vehicle 123" whereas the communication unit 145B may be referred to herein as "the communication unit 145 of the server 107," but the communication units 145A, 145B may be referred to herein as "the communication unit 145." Similarly, the DSRC chip 147A and the DSRC chip 147C are referred to herein individually or collectively as "the DSRC chip 147," and the DSRC-compliant GPS unit 170A and the DSRC-compliant GPS unit 170C are referred to herein individually or collectively as "the DSRC-compliant GPS unit 170." Although no "DSRC chip 147B" or "DSRC-compliant GPS unit 170B" is depicted in FIG. 1A, in some embodiments the server 107 includes one or more of a DSRC chip and a DSRC-compliant GPS unit, and in these embodiments these elements are referred to as "the DSRC chip 147B" or "the DSRC-compliant GPS unit 170B," respectively.

In some embodiments, a DSRC chip 147 of one or more of the DSRC-enabled vehicle 123, the DSRC-enabled device 110 and the server 107 is an element of a communication unit 145. In other embodiments, a DSRC chip 147 of one or more of the DSRC-enabled vehicle 123, the DSRC-enabled device 110 and the server 107 is a stand-alone element or an element of a component which is not the communication unit 145. For example, the DSRC chip 147 may be an element of the DSRC-compliant GPS unit 170.

The communication unit 145 transmits and receives data to and from a network 105 or to another communication channel. In some embodiments, the communication unit 145 may include the DSRC chip 147 and other hardware or software necessary to make the element which includes the communication unit 145 be "DSRC-enabled" and compliant with the DSRC standard.

In some embodiments, the communication unit 145 includes a port for direct physical connection to the network 105 or to another communication channel. For example, the communication unit 145 includes a universal serial bus (USB), secure digital (SD), CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

A DSRC chip 147 includes a DSRC antenna. The DSRC antenna includes one or more of a DSRC transceiver and a DSRC receiver. The DSRC chip 147 is operable to send and receive one or more PSM messages. In some embodiments, the DSRC chip 147 may include any other hardware or software necessary to make the element which includes the DSRC chip 147 be "DSRC-enabled" and compliant with the DSRC standard.

In some embodiments, the DSRC chip 147 receives GPS data from the DSRC-compliant GPS unit 170 so that the DSRC chip 147 can enforce a rule that a PSM message is only transmitted when the GPS data indicates that the DSRC chip 147 is within a threshold distance from roadway infrastructure or a roadway. For example, the threshold distance may be 500 meters (the range for transmitting DSRC messages such as the PSM message), and whether the threshold distance has been met may be determined by the DSRC chip 147 by comparing the GPS data to an roadway infrastructure map stored in a non-transitory memory that is accessible by the DSRC chip 147. The roadway infrastructure map used by the DSRC chip 147 includes digital data that describes different roadway infrastructure and the geographic locations of these different roadway infrastructure. Roadway infrastructure includes, for example: roadways; a parking lot (whether public or private); a parking garage (whether public or private); an airport; sidewalks; mediums; traffic signs; traffic lights; traffic mirrors; cross-walks; public walk-ways; public parks; rest areas; on-ramps; off-ramps; breakdown lanes; roadway median strips; hospital infrastructure related to a roadway; police infrastructure related to a roadway; firefighting infrastructure related to a roadway; and any other component of a roadway or element which is assistive to a roadway. In some embodiments, the roadway infrastructure map is an element of the electronic roadway map 194 and the electronic roadway map 194 is stored in a non-transitory memory that is accessible by the DSRC chip 147A. In some embodiments, the DSRC chip 147 includes code and routines that are operable, when executed by a processor, to execute steps which determine whether the threshold distance is met or exceeded.

In some embodiments, the DSRC chip 147 is licensed by a government (e.g., the United States government, the Japanese government, the German government, a state or province government, etc.) to send and receive DSRC messages so that such messages may be lawfully transmitted, broadcasted and received in a jurisdiction where the DSRC chip 147 is located. For example, in some jurisdictions DSRC messages cannot be lawfully sent or received by a device unless the device which transmits the DSRC message is either licensed to do so or of a type which is permitted to do so under the laws of the jurisdiction (e.g., a first lawful type includes a DSRC-enabled vehicle 123 transmitting a Basic Safety Message and a second lawful type includes a DSRC-enabled device 110 transmitting a PSM message). A PSM message is an example of a DSRC message.

In some embodiments, the DSRC chip 147 is operable to broadcast a PSM message at some fixed interval (once every 0.10 seconds, which is the interval suggested by the DSRC standard) that is user configurable (provided, for example, that the DSRC chip 147 is located at a position which meets or is within the position threshold).

In some embodiments, the DSRC-compliant GPS unit 170 is operable to retrieve GPS data (not pictured) that includes digital data that describes one or more locations (or positions) of the element which includes the DSRC-compliant GPS unit 170 (e.g., the DSRC-enabled vehicle 123, the DSRC-enabled device 110, the server 107) at one or more different times. The time value may be an element of the GPS data. The GPS data may also describe the latitude and longitude of the element which includes the DSRC-compliant GPS unit 170. The GPS data may be timestamped to indicate the time when the DSRC-enabled vehicle 123 was at this particular location.

In some embodiments, the DSRC-compliant GPS unit 170 includes any hardware or software necessary to make the element which includes the DSRC-compliant GPS unit 170, or the DSRC-compliant GPS unit 170 itself, compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 170 is operable to provide GPS data describing the location of the element which includes the DSRC-compliant GPS unit 170 with lane-level accuracy. For example, the DSRC-enabled device 110 including the DSRC-compliant GPS unit 170 is in the pocket of a pedestrian 103 who is within a business of a strip mall having many different businesses, and the GPS data provided by the DSRC-compliant GPS unit 170 describes the location of the pedestrian 103 with an accuracy of plus or minus 1.5 meters such that the GPS data can be used to accurately identify that the pedestrian 103 is sitting in a particular business of the strip mall. In the context of the optimization client 199 and the optimization system 197, lane level accuracy enables the optimization client 199 and the optimization system 197 to more accurately determine characteristic behavior data 192 for different geographic locations so that the motion profile of the DSRC-enabled vehicle 123 can be accurately optimized based on this characteristic behavior data 192 (e.g.: the DSRC-enabled vehicle 123 slows down when driving near a night club of the strip mall at 11:00 PM but perhaps not the painting supply store within the same strip mall at 11:00 PM; the DSRC-enabled vehicle 123 slows down when driving near a night club at 11:00 PM but maybe not a 11:00 AM; etc.). By contrast, since a conventional GPS unit can only provide positional information with an accuracy of plus or minus 10 meters, such conventional GPS units may not be compatible with some embodiments of the optimization client 199 and the optimization system 197 since positional information from the conventional GPS unit cannot be used to accurately identify the geographic location of the pedestrian 103.

In some embodiments, the DSRC-compliant GPS unit 170 includes hardware that wirelessly communicates with a GPS satellite to retrieve GPS data that describes a location of the element which includes the DSRC-compliant GPS unit 170 with a precision that is compliant with the DSRC standard. The DSRC standard requires that GPS data be precise enough to infer if two vehicles (one of which is, for example, the DSRC-enabled vehicle 123) are in the same lane at the same time. The lane may be a lane of a roadway. In some embodiments, the DSRC-compliant GPS unit 170 is operable to identify, monitor and track its two-dimensional position within 1.5 meters of its actual position 68% of the time under an open sky. Since lanes of a roadway are typically no less than 3 meters wide, whenever the two-dimensional error of the GPS data is less than 1.5 meters the GPS data provided by the DSRC-compliant GPS unit 170 may be analyzed to and determine what lane of the roadway the DSRC-enabled vehicle 123 is traveling in based on the relative positions of two or more different vehicles (one of which is, for example, the DSRC-enabled vehicle 123) on the roadway at the same time.

In another embodiment, the DSRC-enabled device 110 includes a non-transitory memory storing data which describe a plurality of different geographic locations for a plurality of different businesses or locations, and the DSRC-enabled device 110 only transmits a PSM message when the DSRC-enabled device 110 is within one of these businesses or locations based on the GPS data provided by the DSRC-compliant GPS unit 170 included in the DSRC-enabled device 110.

In some embodiments, the DSRC-compliant GPS unit 170 includes functionality to provide navigation assistance to the element which includes the DSRC-compliant GPS unit 170.

Although only one or more of the following elements are depicted in FIG. 1A, in practice the operating environment 100 may include one or more of the following elements: the pedestrian 103; the DSRC-enabled device 110; the server 107; the network 105; and the DSRC-enabled vehicle 123. For example, as described below, in practice a single DSRC-enabled vehicle 123 may receive PSM messages from hundreds, thousands or even millions of different DSRC-enabled devices 110.

Referring now to the DSRC-enabled vehicle 123. The ADAS system set 180 may include one or more advanced driver assistance systems ("ADAS systems"). See, for example, the one or more ADAS systems 280 depicted in FIG. 2A. Examples of ADAS systems included in the ADAS system set 180 include one or more of the following elements of the DSRC-enabled vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems are also referred to herein as an "autonomous feature" or an "autonomous functionality," respectively. In some embodiments, the autonomous features and autonomous functionality provided by the ADAS systems of the ADAS system set 180 are sufficient to classify the DSRC-enabled vehicle 123 as one or more of the following: a Level 1 autonomous vehicle; a Level 2 autonomous vehicle; a Level 3 autonomous vehicle; a Level 4 autonomous vehicle; and a Level 5 autonomous vehicle. In some embodiments, the DSRC-enabled vehicle 123 is an HAV. An HAV is an autonomous vehicle whose ADAS system set 180 provides autonomous functionality sufficient to operate at Level 3 or greater. An example of an onboard vehicle computer for the DSRC-enabled vehicle 123 is depicted in FIG. 2A according to some embodiments. In some embodiments, FIG. 2A depicts an electronic control unit of the DSRC-enabled vehicle 123.

The PSM data structure 196 is a data structure which stores digital data. For example, the PSM data structure 196 stores one or more instances of PSM data 195 which are received by the communication unit 145 of the DSRC-enabled vehicle 123 via the network 105. For example, the communication unit 145 of the DSRC-enabled device 110 broadcasts a PSM message that includes the PSM data 195 and the communication unit 145 of the DSRC-enabled vehicle 123 receives the PSM message and stores the PSM data 195 included in the PSM message in the PSM data structure 196. In some embodiments, the communication unit 145 of the DSRC-enabled vehicle 123 receives a plurality of PSM messages broadcasted by a plurality of different DSRC-enabled devices 110 while located at a plurality of different geographic locations, the communication unit 145 of the DSRC-enabled vehicle 123 stores the plurality of different instances of the PSM data 195 included in the plurality of PSM messages in the PSM data structure 196.

In some embodiments, the PSM data structure 196 includes a non-transitory memory of the DSRC-enabled vehicle 123 or is stored in a non-transitory memory as depicted in FIG. 2A (see, e.g., the memory 227A).

The PSM data 195 is described below with reference to FIG. 1B according to some embodiments.

In some embodiments, the optimization client 199 includes code and routines that are operable, when executed by a processor of the DSRC-enabled vehicle 123 (see, e.g., the processor 225A depicted in FIG. 2A), to cause the processor to execute one or more steps of the method 300 described below with reference to FIGS. 3A and 3B or one or more steps of the method 400 described below with reference to FIGS. 4A and 4B. The optimization client 199 is described in more detail below.

In some embodiments, the optimization client 199, when executed by the processor of the DSRC-enabled vehicle 123, causes the communication unit 145 of the DSRC-enabled vehicle 123 to transmit the PSM data 195 included PSM data structure 196 (or the PSM data structure 196 itself) to the server 107 via the network 105. In this way the optimization system 197 builds or modifies the aggregated PSM data structure 190 using PSM data 195 aggregated from one or more DSRC-enabled vehicles 123.

Figure 1C:
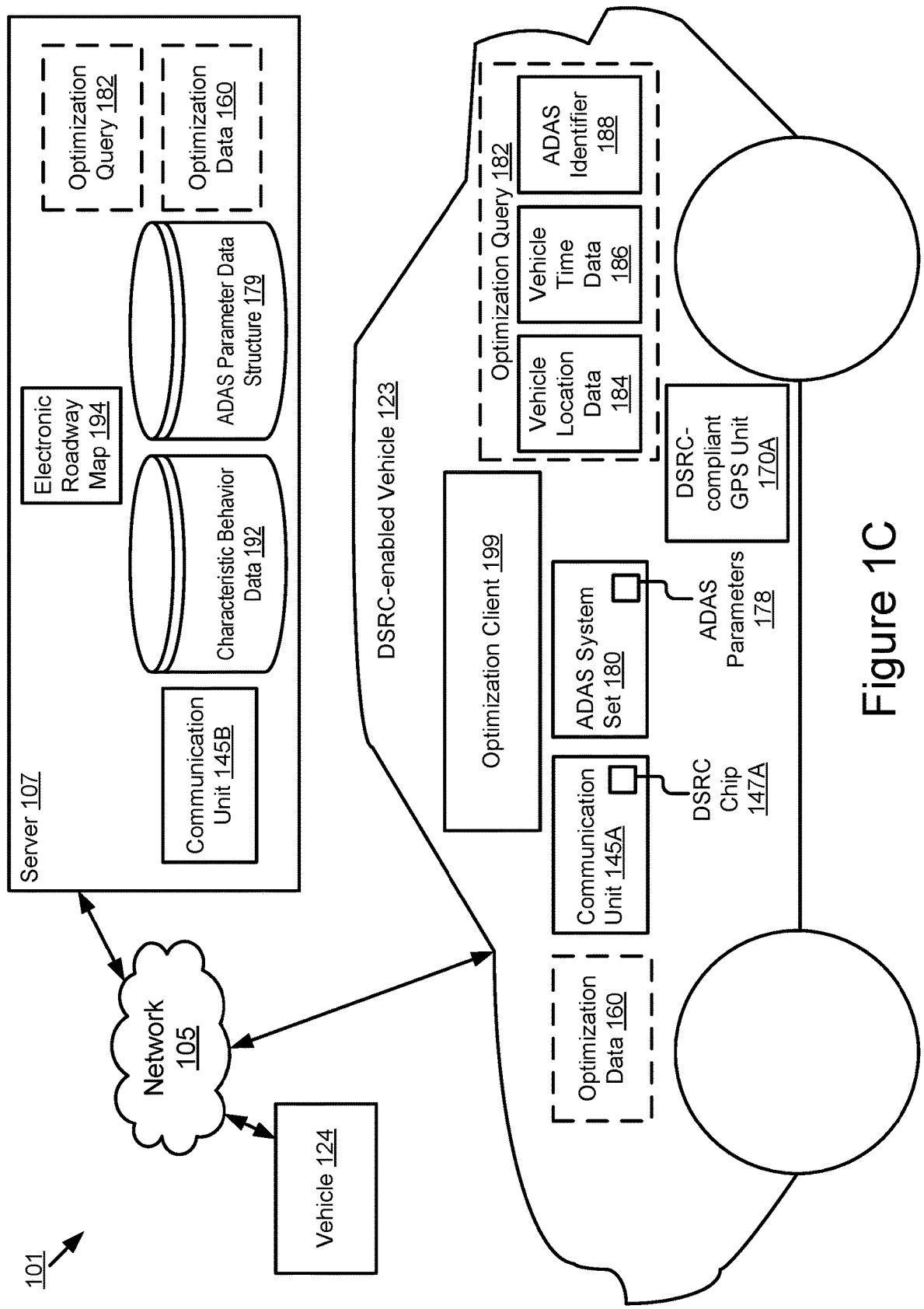
FIG. 1C is a block diagram illustrating another operating environment for the optimization client and the optimization system at a runtime according to some embodiments.

In some embodiments, the optimization client 199 of the DSRC-enabled vehicle 123 may be implemented using hardware including a field-programmable gate array ("FPGA") or an application-specific integrated circuit ("ASIC"). In some other embodiments, the optimization client 199 may be implemented using a combination of hardware and software. The optimization client 199 may be stored in a combination of the devices (e.g., servers or other devices), or in one of the devices. Additional elements of the DSRC-enabled vehicle 123 are depicted in FIG. 1C and FIG. 2A according to some embodiments.

Referring now to the server 107. The communication unit 145 of the server 107 receives a wireless message transmitted by the DSRC-enabled vehicle 123 that includes the PSM data 195. The communication unit 145 of the server 107 stores the PSM data 195 in the aggregated PSM data structure 190. The aggregated PSM data structure 190 may include one or more different instances of PSM data 195 transmitted by one or more different DSRC-enabled vehicles 123.

The aggregated PSM data structure 190 is a data structure which stores digital data. For example, the aggregated PSM data structure 190 stores one or more instances of PSM data 195 which are received by the communication unit 145 of the server 107 via the network 105. For example, the communication unit 145 of the DSRC-enabled vehicle 123 transmits a wireless message that includes the PSM data 195 (or the PSM data structure 196) and the communication unit 145 of the server 107 receives the wireless message and stores the PSM data 195 (or PSM data structure) included in the wireless message in the aggregated PSM data structure 190. In some embodiments, this process is repeated for a plurality of different wireless messages transmitted by a plurality of different DSRC-enabled vehicles 123, and the communication unit 145 of the server 107 stores the plurality of different instances of the PSM data 195 included in the plurality of wireless messages in the aggregated PSM data structure 190.

Figure 2B:
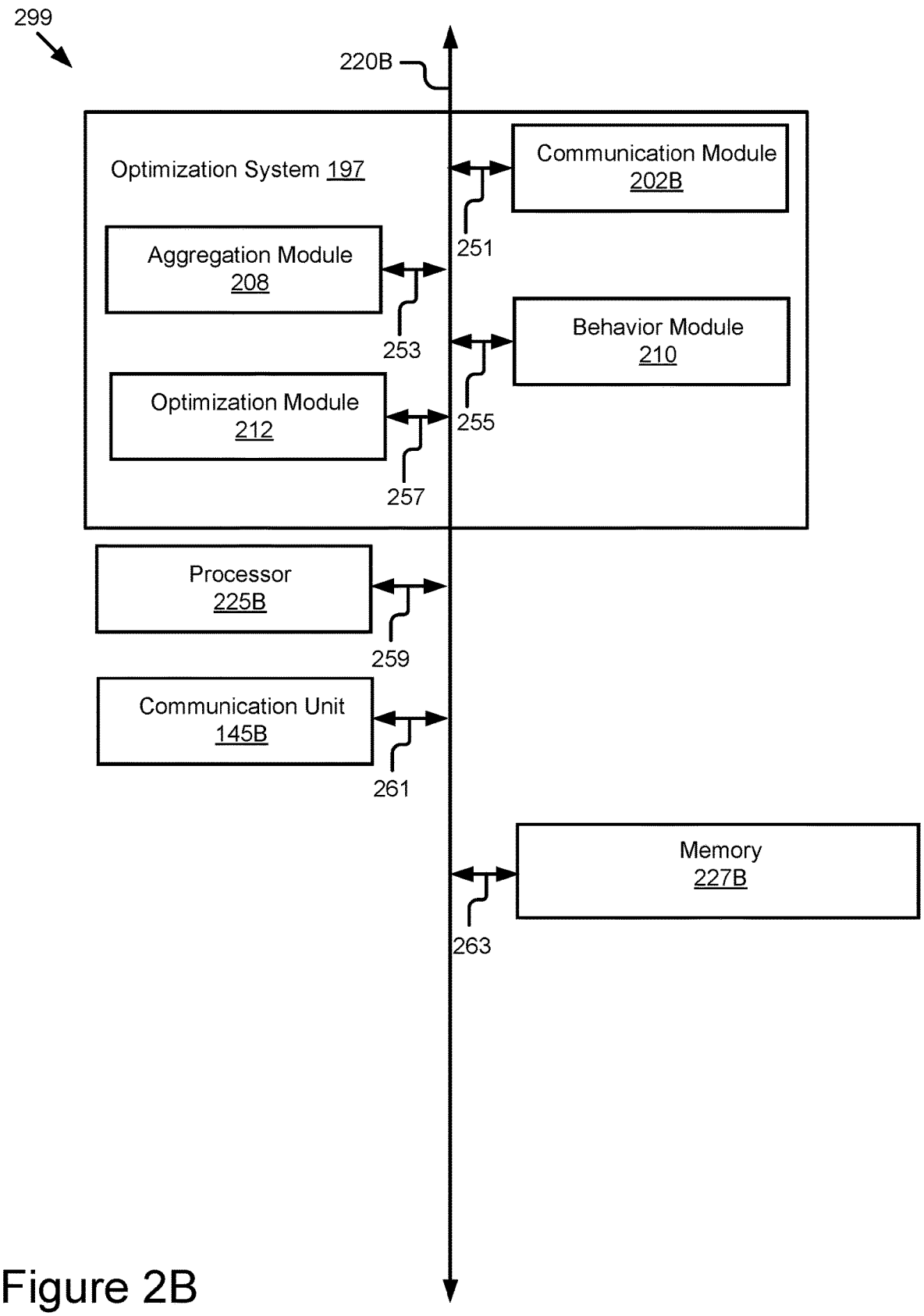
FIG. 2B is a block diagram illustrating an example computer system including the optimization system according to some embodiments.

In some embodiments, the aggregated PSM data structure 190 includes a non-transitory memory of the server 107 or is stored in a non-transitory memory as depicted in FIG. 2B (see, e.g., the memory 227B).

The electronic roadway map 194 is digital data that describes different geographic locations within a geographic area. The electronic roadway map 194 is stored in a non-transitory memory of the server 107 (see, e.g., the memory 227B depicted in FIG. 2B). In some embodiments, the electronic roadway map 194 is operable so that each geographic location included in the electronic roadway map 194 can be associated with different instances of characteristic behavior data 192 for different days of the week and different times of the day by the optimization system 197. In some embodiments, the electronic roadway map 194 is operable so that the characteristic behavior data 192 for different geographic locations is stored in the electronic roadway map 194 by the optimization system 197.

In some embodiments, the optimization system 197 includes code and routines that are operable, when executed by a processor of the server 107 (see, e.g., the processor 225B depicted in FIG. 2B), to cause the processor to execute one or more steps of the method 300 described below with reference to FIGS. 3A and 3B or one or more steps of the method 400 described below with reference to FIGS. 4A and 4B. The optimization client 199 is described in more detail below.

In some embodiments, the optimization client 199, when executed by the processor of the server 107, causes the communication unit 145 of the server 107 to receive a wireless message including the PSM data 195 (or the PSM data structure 196 itself) via the network 105 and then build or modify the aggregated PSM data structure 190 using this PSM data 195. In this way the optimization system 197 builds or modifies the aggregated PSM data structure 190 using PSM data 195 received from one or more DSRC-enabled vehicles 123.

The optimization system 197, when executed by the processor of the server 107, analyzes the PSM data 195 stored in the aggregated PSM data structure 190 for different geographic locations to determine characteristic behavior data 192 for the different geographic locations and then associate this characteristic behavior data 192 with the data entry for the corresponding geographic location in the electronic roadway map 194. The characteristic behavior data 192 describes the characteristic behavior of one or more pedestrians at different geographic locations for different days of the week and times of the day.

Figure 1D:
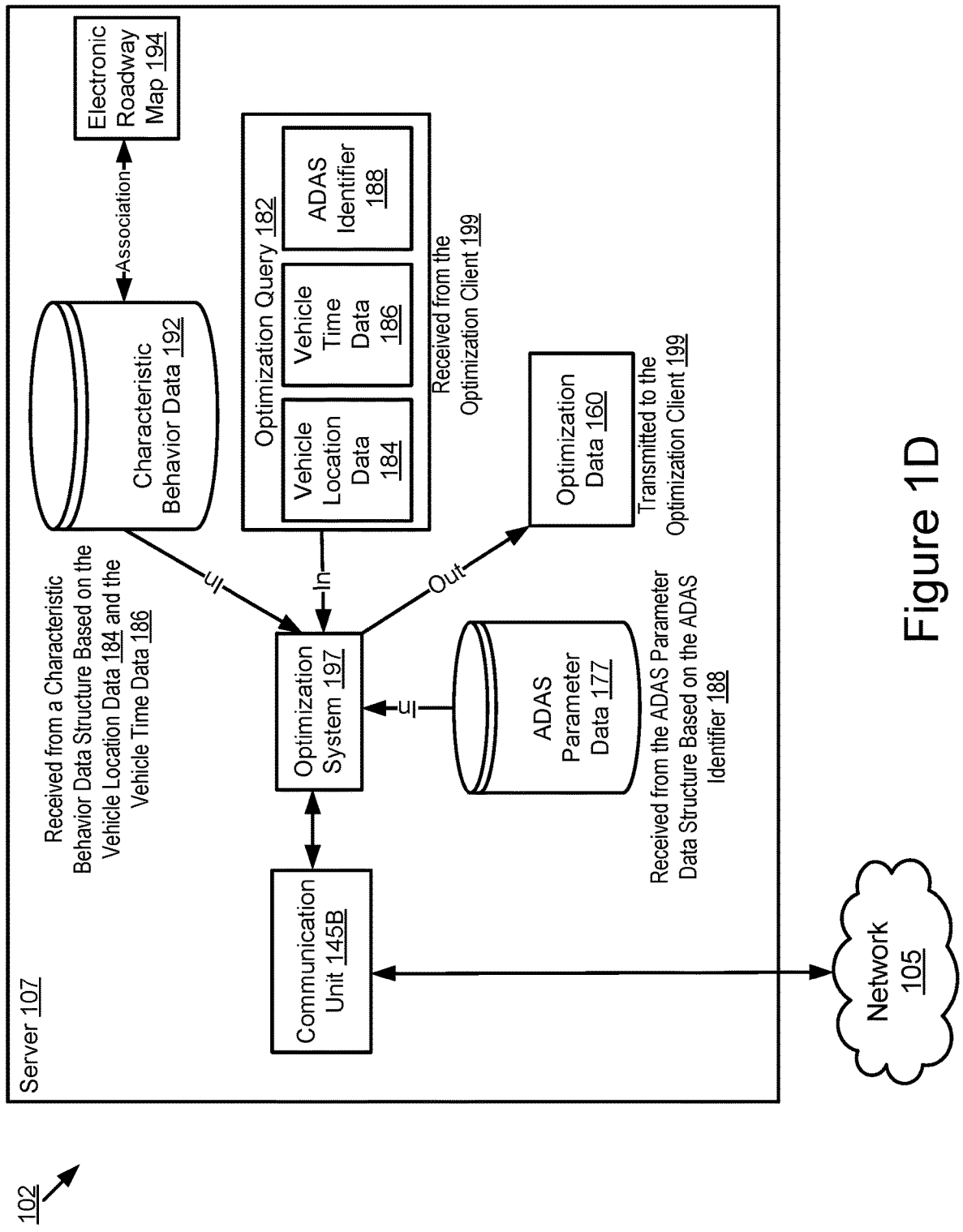
FIG. 1D is a block diagram illustrating a process for the optimization system to determine optimization data according to some embodiments.

In some embodiments, the optimization system 197 of the server 107 may be implemented using hardware including an FPGA or an ASIC. In some other embodiments, the optimization system 197 may be implemented using a combination of hardware and software. The optimization system 197 may be stored in a combination of the devices (e.g., servers or other devices), or in one of the devices. Additional elements of the server are depicted in FIGS. 1C, 1D and FIG. 2B according to some embodiments.

In some embodiments, a design time includes a period of time when the aggregated PSM data structure 190 and an electronic roadway map 194 including or associated with characteristic behavior data 192 for different geographic locations is determined based on PSM data 195 included in the aggregated PSM data structure 190. One or more DSRC-enabled devices 110 broadcast a plurality of PSM messages while present at one or more different geographic locations. For example, a plurality of pedestrians 103 have their DSRC-enabled smartphones on their person and these DSRC-enabled smartphones repeatedly broadcast PSM messages at a regular interval so long as the DSRC-enabled smartphones are within 500 meters of a roadway (or some other element of a roadway infrastructure). The DSRC-enabled vehicle 123 receives the plurality of PSM messages. The optimization client 199 includes code and routines that, when executed by a processor of the DSRC-enabled vehicle 123, cause the processor to extract a plurality of different instances of PSM data 195 from the plurality of PSM messages and stores the PSM data 195 in a non-transitory memory of the DSRC-enabled vehicle 123.

In another embodiment, the DSRC-enabled device 110 includes a non-transitory memory storing data which describe a plurality of different geographic locations for a plurality of different businesses or locations, and the DSRC-enabled device 110 only transmits a PSM message when the DSRC-enabled device 110 is within one of these businesses or locations based on the GPS data provided by the DSRC-compliant GPS unit 170 included in the DSRC-enabled device 110.

In some embodiments, the optimization client 199 includes code and routines that, when executed by the processor of the of the DSRC-enabled vehicle 123, causes a communication unit 145 of the DSRC-enabled vehicle 123 to transmit a wireless message to the server 107 via the network 105. The wireless message includes the PSM data 195 which is stored in the non-transitory memory of the DSRC-enabled vehicle 123.

In some embodiments, the server 107 includes the optimization system 197. The optimization system 197 includes code and routines that, when executed by a processor of the server 107, causes the processor to aggregate the different instances of PSM data 195 received from a plurality of different DSRC-enabled vehicles 123 to form the aggregated PSM data structure 190. The aggregated PSM data structure 190 includes different instances of PSM data 195 for a plurality of different geographic locations at a plurality of different times of day and days of the week. In this way the aggregated PSM data structure 190 includes different instances of PSM data 195 that describe pedestrian activity in relation to roadway infrastructure while present at different geographic locations for different days of the week and different times of the day.

In some embodiments, the optimization system 197 includes code and routines that, when executed by a processor of the server 107, cause the processor to analyze the PSM data 195 stored in the aggregated PSM data structure 190 to determine characteristic behavior data 192 that describes the characteristic behavior of pedestrians at different geographic locations for different days of the week and times of the day.

In some embodiments, the optimization system 197 includes code and routines that, when executed by a processor of the server 107, cause the processor to build the characteristic behavior data 192 so that each combination of (1) geographic location, (2) day of week and (3) time of day has its own instance of characteristic behavior data 192 stored in a non-transitory memory of the server 107. In this way the characteristic behavior of pedestrians at a plurality of geographic locations can be identified and known for different days of the week and different times of the day based on the characteristic behavior data 192. The optimization system 197 stores the characteristic behavior data 192 in the non-transitory memory of the server 107.

In some embodiments, the non-transitory memory of the server 107 also stores the electronic roadway map 194. The electronic roadway map 194 includes digital data that describes different geographic locations within a geographic area. In some embodiments, the electronic roadway map 194 is operable so that each geographic location included in the electronic roadway map 194 can be associated with different instances of characteristic behavior data 192 for different days of the week and different times of the day.

In some embodiments, the optimization system 197 includes code and routines that, when executed by a processor of the server 107, cause the processor to associate the characteristic behavior data 192 with the corresponding geographic locations included in the electronic roadway map 194 such that electronic roadway map 194 describes: (1) different geographic locations; and (2) for some or all of these geographic locations, characteristic behavior data 192 which is determinable based on one or more different instances of PSM data 195 which is stored in the aggregated PSM data structure 190. In this way the optimization system 197 beneficially communicates with a plurality of optimization clients 199 included in a plurality of different DSRC-enabled vehicles 123 to form an aggregated PSM data structure 190 and an electronic roadway map 194 including (or associated with) characteristic behavior data 192 for different geographic locations at different days of the week and different times of the day.

In some embodiments, the process described above is repeated as new characteristic behavior data 192 is determined by the optimization system 197 responsive to the optimization system 197 receiving new instances of PSM data 195, which is then stored by the optimization system 197 in the aggregated PSM data structure 190, which then triggers the optimization system 197 to generate new characteristic behavior data 192 for the geographic locations described by the new instances of PSM data 195 so that the characteristic behavior data 192 included in the electronic roadway map 194 is increased or modified based on the newly received instances of PSM data 195. In this way the optimization system 197 beneficially communicates with a plurality of optimization clients 199 included in a plurality of different DSRC-enabled vehicles 123 to increase or modify the PSM data 195 included in the aggregated PSM data structure 190 and the characteristic behavior data 192 included in (or associated with) the electronic roadway map 194.

Referring now to FIG. 1B, depicted is a block diagram illustrating an example of PSM data 195 according to some embodiments. In some embodiments, an instance of PSM data 195 describes the relationship between a particular pedestrian (or a group of pedestrians) in relation to roadway infrastructure for a particular geographic location. The roadway infrastructure may be an element of a roadway environment which includes a DSRC-enabled vehicle 123 which receives the PSM message that includes the PSM data 195.

As depicted, the PSM data 195 includes two parts: Part 1; and Part 2.

Part 1 of the PSM data 195 includes digital data that describes: the GPS data for the DSRC-enabled device; and the path history data for the DSRC-enabled device.

The elements of the GPS data are depicted in FIG. 1B according to some embodiments. In some embodiments, the GPS data is generated by a DSRC-compliant GPS unit such that the GPS data included in Part 1 is accurate to within plus or minus 1.5 meters 68% of the time when the DSRC-compliant GPS unit of the DSRC-enabled device is under an open sky.

In some embodiments, the path history data describes historical GPS data for a successive number of past times such that the path history data describes a historical path of the DSRC-enabled device.

Part 2 of the PSM data 195 includes digital data that describes: a path prediction of the DSRC-enabled device over a specified time and frame (e.g., based on a trajectory indicated by the path history data of Part 1); a group size for the pedestrian who is carrying the DSRC-enabled device; a group radius for the pedestrian who is carrying the DSRC-enabled device; an estimate of whether the pedestrian is pushing a stroller (e.g., based on one or more of their path history, trajectory, acceleration, walking pattern and other data indicated by the digital data included in Part 1 or Part 2 versus known data for people pushing strollers); an estimate of whether the pedestrian has the intent to cross a roadway (e.g., based on the pedestrian's trajectory); an estimate of whether the pedestrian is traveling with an animal (e.g., based on one or more of their path history, trajectory, acceleration, walking pattern and other data indicated by the digital data included in Part 1 or Part 2 versus known data for pedestrians traveling with animals); an estimate of the type of animal traveling with the pedestrian if the pedestrian is estimated to be walking with an animal (e.g., based on one or more of their path history, trajectory, acceleration, walking pattern and other data indicated by the digital data included in Part 1 or Part 2 versus known data for specific animal types or pedestrians traveling with such animals); an estimate of whether the pedestrian is utilizing non-vehicular propulsion (e.g., based on one or more of their path history, trajectory, acceleration, walking pattern and other data indicated by the digital data included in Part 1 or Part 2 versus known data for pedestrians traveling on a bike, scooter, skateboard, or any other type of non-vehicle propulsion.)

Referring now to FIG. 1C, depicted is a block diagram illustrating another operating environment 101 for the optimization client 199 and the optimization system 197 at a runtime according to some embodiments.

As depicted, the operating environment includes a server 107, a DSRC-enabled vehicle 123 and a vehicle 124 communicatively coupled by a network 105. These elements of the operating environment 101 were described above with reference to FIG. 1A, and so, those descriptions will not be repeated here: the server 107; and the DSRC-enabled vehicle 123.

In some embodiments, the server 107 includes one or more of the following elements: the optimization system 197; the communication unit 145; the electronic roadway map 194; the characteristic behavior data 192; ADAS parameter data 177; an optimization query 182; and optimization data 160. These elements of the server 107 were described above with reference to FIG. 1A, and so, their descriptions will not be repeated here: the optimization system 197; the communication unit 145; the electronic roadway map 194; and the characteristic behavior data 192.

The optimization query 182 and the optimization data 160 are depicted in FIG. 1C using a dashed line to indicate that these elements are also depicted in FIG. 1C as elements of the DSRC-enabled vehicle 123. For example, the optimization client 199 of the DSRC-enabled vehicle 123 generates the optimization query 182 and causes the communication unit 145 of the DSRC-enabled vehicle 123 to transmit the optimization query 182 to the server 107 via the network 105. The communication unit 145 of the server receives the optimization query 182 and provides it as an input to the optimization system 197. The optimization system 197 generates the optimization data 160 as shown in FIG. 1D and causes the communication unit 145 of the server 107 to transmit the optimization data 160 to the DSRC-enabled vehicle 123 via the network 105.

In some embodiments, the DSRC-enabled vehicle 123 includes one or more of the following elements: the optimization client 199; the communication unit 145; the ADAS system set 180; the DSRC-compliant GPS unit 170; the optimization query 182; and the optimization data 160. These elements of the DSRC-enabled vehicle 123 were described above with reference to FIG. 1A, and so, their descriptions will not be repeated here the optimization client 199; the communication unit 145; the ADAS system set 180; and the DSRC-compliant GPS unit 170.

In some embodiments, a runtime includes a period of time when a motion profile for the DSRC-enabled vehicle 123 is modified based on the characteristic behavior data 192 for the geographic location where the DSRC-enabled vehicle 123 is located at a particular day of the week and a particular time of the day as described by the vehicle location data 184 which is generated by the DSRC-compliant GPS unit 170. The runtime is now described according to some embodiments.

In some embodiments, the optimization client 199 of the DSRC-enabled vehicle 123 includes code and routines that are operable, when executed by a processor of the DSRC-enabled vehicle 123 (see, e.g., the processor 225A depicted in FIG. 2A), to cause the processor to call the DSRC-compliant GPS unit 170 of the DSRC-enabled vehicle 123 to receive GPS data describing: (1) the current time of day; (2) the current day of the week; and (3) the current geographic location of the DSRC-enabled vehicle. The vehicle location data 184 is digital data that describes the current geographic location of the DSRC-enabled vehicle 123. The vehicle time data 186 is digital data that describes the current time of day and the current day of the week when the GPS data is received by the DSRC-compliant GPS unit 170.

In some embodiments, the optimization client 199 of the DSRC-enabled vehicle 123 includes code and routines that are operable, when executed by the processor of the DSRC-enabled vehicle 123, to cause the processor to call the ADAS system set 180 of the DSRC-enabled vehicle 123 to request the ADAS identifiers 188 for the ADAS system set 180 of the DSRC-enabled vehicle 123. An ADAS identifier 188 is digital data that identifies an ADAS system included in the ADAS system set 180 of the DSRC-enabled vehicle 123. Each ADAS system includes its own ADAS identifier 188. The ADAS system set 180 of the DSRC-enabled vehicle 123 control the operation of the DSRC-enabled vehicle 123, and so, the ADAS system set 180 control the motion profile of the DSRC-enabled vehicle 123.

In some embodiments, the motion profile describes how the DSRC-enabled vehicle 123 drives or is operated relative to how the DSRC-enabled vehicle 123 is typically operated or how other vehicles are operated at the same time of day or day of the week. For example, the motion profile describes whether the DSRC-enabled vehicle is operated in a more non-risk adverse manner (e.g., accelerates faster than usual, drives with a velocity which is faster than usual, is more hesitant to break than usual, etc.) or in a more risk adverse manner (accelerates slower than usual, drives with a velocity that is slower than usual, breaks more readily than usual, etc.).

In some embodiments, the optimization client 199 of the DSRC-enabled vehicle 123 includes code and routines that are operable, when executed by the processor of the DSRC-enabled vehicle 123, to cause the processor to generate the optimization query 182. The optimization query 182 is a wireless message that requests optimization data 160 from the server 107. In some embodiments, the optimization query 182 includes digital data including: (1) the vehicle time data 186 describing the current time of day and the current day of the week; (2) the vehicle location data describing a current geographic location of the DSRC-enabled vehicle 123 [optionally, with an accuracy of plus or minus 1.5 meters]; and (3) ADAS identifier 188 data describing a set of ADAS identifiers for the ADAS system set 180 of the DSRC-enabled vehicle 123.

In some embodiments, the optimization client 199 of the DSRC-enabled vehicle 123 includes code and routines that are operable, when executed by the processor of the DSRC-enabled vehicle 123, to cause the processor to cause the communication unit 145 of the DSRC-enabled vehicle 123 to transmit the optimization query 182 to the server 107 via the network 105.

In some embodiments, the communication unit 145 of the server 107 receives the optimization query 182 from the network 105. The communication unit 145 of the server 107 transmits the optimization query 182 to the optimization system 197 as an input to the optimization system 197.

In some embodiments, the optimization system 197 of the server 107 includes code and routines that are operable, when executed by the processor of the server 107 (see, e.g., the processor 225B depicted in FIG. 2B), to cause the processor to analyze the optimization query 182 to determine the current time of day, day of week and geographic location of the DSRC-enabled vehicle 123. For example, the processor analyzes the vehicle location data 184 and the vehicle time data 186 included in the optimization query 182 and determines the current time of day, day of week and geographic location of the DSRC-enabled vehicle 123 based on this analysis.

In some embodiments, the optimization system 197 of the server 107 includes code and routines that are operable, when executed by the processor of the server 107, to cause the processor to retrieve the characteristic behavior data 192 for this particular time of day, day of week and geographic location. For example, the server 107 includes a characteristic behavior data structure which is stored on a non-transitory memory and indexed based on geographic location, time of day and day of week such that the optimization system 197 causes the processor of the server 107 to query the characteristic behavior data structure using the vehicle location data 184 and the vehicle time data 186 as inputs to receive characteristic behavior data 192 that corresponds to the particular time of day, day of week and geographic location described by the vehicle location data 184 and the vehicle time data 186.

In some embodiments, the characteristic behavior data 192 describes the typical behavior of pedestrians at the location, day of the week and time of the day described by the vehicle location data 184 and the vehicle time data 186 as indicated by the PSM data broadcasted by DSRC-enabled vehicles at this location on a similar day of the week and time of the day. In some embodiments, the optimization system 197 of the server 107 includes code and routines that are operable, when executed by the processor of the server 107, to analyze the characteristic behavior data 192 and determine a motion profile for the DSRC-enabled vehicle 123 which is determined to be safe based on the typical pedestrian behavior described by the characteristic behavior data 192.

The server 107 includes a non-transitory memory that stores the ADAS parameter data structure 179 which is accessible by the optimization system 197. The ADAS parameter data structure 179 include ADAS parameter data that describes the various settings available for different ADAS systems which can be configured so that these ADAS system control the operation of a vehicle in a manner that is consistent with the motion profile determined to be safe or appropriate by the optimization system 197 based on the character behavior data 192 retrieved by the optimization system 197 as described in the preceding paragraph.

For example, the ADAS parameter data structure 179 is indexed based on different ADAS identifiers (such as the ADAS identifier 188) so that ADAS parameters for different ADAS systems are capable of retrieval from the ADAS parameter data structure 179 based on different ADAS identifiers included in different optimization queries 182. In some embodiments, the ADAS parameter data structure 179 is operable to receive a batch of ADAS identifiers 188 as a batch query and respond to the batch query with sets of parameters for the ADAS systems associated with the ADAS identifiers 188 included in the batch query.

In some embodiments, the optimization system 197 of the server 107 includes code and routines that are operable, when executed by the processor of the server 107, to cause the processor to query the ADAS parameter data structure 179 using the an ADAS identifier 188 included in the optimization query 182 and the ADAS parameter data structure 179 responds to the query submitted to the ADAS parameter data structure 179 with a set of parameters for the ADAS system associated with the particular ADAS identifier 188 included in the query which are configurable by modifying the settings of the ADAS system identified by the ADAS identifier 188 included in the query; this process of querying the ADAS parameter data structure 179 with an ADAS identifier 188 is either (1) repeated serially for each individual ADAS identifier 188 included in the optimization query 182 or (2) completed as a batch if the ADAS parameter data structure 179 is operable to receive a batch of ADAS identifiers 188 as a batch query and respond to the batch query with sets of parameters for the ADAS systems associated with the ADAS identifiers 188 included in the batch query. In this way, the optimization system 197 beneficially acquires knowledge about which ADAS parameters of the ADAS systems of the DSRC-enabled vehicle 123 are configurable based on the characteristic behavior data 192.

In some embodiments, the optimization system 197 of the server 107 includes code and routines that are operable, when executed by the processor of the server 107, to cause the processor to analyze (1) the motion profile determined based on the characteristic behavior data 192 and (2) the set of ADAS parameters describing ADAS parameters of the DSRC-enabled vehicle 123 which are available for modification, to determine optimization data 160 which describes modifications for the settings of the ADAS parameters 177 of the ADAS systems of the DSRC-enabled vehicle 123 that will cause the set of ADAS systems to operate the DSRC-enabled vehicle with the motion profile that is consistent with the characteristic behavior data 192 for the particular geographic location of the DSRC-enabled vehicle 123 at this particular time of day and day of week.

In some embodiments, the optimization system 197 of the server 107 includes code and routines that are operable, when executed by the processor of the server 107, to cause the processor to control the operation of the communication unit 145 of the server 107 so that the communication unit 145 transmits a response message to the DSRC-enabled vehicle 123 via the network 105. The response message includes the optimization data 160.

In some embodiments, the communication unit 145 of the DSRC-enabled vehicle 123 receives the optimization data 160 from the network 105 and transmits the optimization data 160 to the optimization client 199 or stores the optimization data 160 in a non-transitory memory of the DSRC-enabled vehicle 123.

In some embodiments, the optimization client 199 of the DSRC-enabled vehicle includes code and routines that are operable, when executed by a processor of the DSRC-enabled vehicle, to modify the settings for the ADAS parameters of the ADAS system set 180 of the DSRC-enabled vehicle based on the optimization data 160, thereby modifying the motion profile of the DSRC-enabled vehicle 123 to be consistent with the characteristic behavior data 192 for the geographic location where the DSRC-enabled vehicle 123 is located at this particular day of the week and time of the day.

In some embodiments, the vehicle 124 is a second vehicle included in the operating environment in addition to the DSRC-enabled vehicle 123. The vehicle 124 includes some or all of the elements of the DSRC-enabled vehicle 123, so long as the vehicle 124 always includes the communication unit 145 and the optimization client 199. For example, the vehicle 124 is a connected vehicle that includes the optimization client 199. The vehicle 124 is depicted in FIG. 1C to make clear that in some embodiments a vehicle 124 which has not transmitted any PSM data 195 to the server 107 can still transmit an optimization query 182 and receive optimization data 160 which is used by the optimization client 199 of the vehicle 124 to modify the operation of the ADAS system set 180 of the vehicle 124. In some embodiments, the computer system 200 included in FIG. 2A is an element of the vehicle 124. In some embodiments, the compute system 200 of the vehicle 124 executes one or more steps of the method 400 described below with reference to FIGS. 4A and 4B. In some embodiments, the vehicle includes a DSRC-compliant GPS unit even if is a connected vehicle but not a DSRC-enabled vehicle.

Referring now to FIG. 1D, depicted is a block diagram illustrating a process 102 for the optimization system 197 to determine optimization data 160 according to some embodiments.

The following are received as inputs to the optimization system 197: the optimization query 182; characteristic behavior data 192; ADAS parameter data 177.

In some embodiments, the characteristic behavior data 192 is retrieved from a characteristic behavior data structure based on the vehicle location data 184 and the vehicle time data 186 (which together form an example of GPS data from a DSRC-compliant GPS unit). In some embodiments, the characteristic behavior data structure is an element of the aggregated PSM data structure 190 and is built as the optimization system 197 associates different instances of characteristic behavior data 192 with the electronic roadway map 194. In some embodiments, the association of the characteristic behavior data 192 and the electronic roadway map 194 forms the characteristic behavior data structure.

For example, the server 107 includes a characteristic behavior data structure which is stored on a non-transitory memory and indexed based on geographic location, time of day and day of week such that the optimization system 197 causes the processor of the server 107 to query the characteristic behavior data structure using the vehicle location data 184 and the vehicle time data 186 as inputs to receive characteristic behavior data 192 that corresponds to the particular time of day, day of week and geographic location described by the vehicle location data 184 and the vehicle time data 186.

In some embodiments, the characteristic behavior data 192 describes the typical behavior of pedestrians at the location, day of the week and time of the day described by the vehicle location data 184 and the vehicle time data 186 as indicated by the PSM data broadcasted by DSRC-enabled vehicles at this location on a similar day of the week and time of the day. In some embodiments, the optimization system 197 of the server 107 includes code and routines that are operable, when executed by the processor of the server 107, to analyze the characteristic behavior data 192 and determine the motion profile for the DSRC-enabled vehicle 123 which is determined to be safe based on the typical pedestrian behavior described by the characteristic behavior data 192.

In some embodiments, the optimization system 197 queries the ADAS parameter data structure using one or more ADAS identifiers to retrieve ADAS parameter data 177. The ADAS parameter data 177 includes digital data that describes the one or more ADAS parameters of the DSRC-enabled vehicle 123 which transmitted the optimization query 182 that are available to be configured to cause the ADAS system set 180 of the DSRC-enabled vehicle 123 to operate the DSRC-enabled vehicle 123 in a manner consistent with the motion profile which is determined to be safe based on the typical pedestrian behavior described by the characteristic behavior data 192.

Based on these inputs, the optimization system 197 outputs the optimization data 160 and causes the communication unit 145 to transmit the optimization data 160 to the optimization client 199 of the DSRC-enabled vehicle 123 via the network 105.

Example Computer Systems

Referring now to FIG. 2A, depicted is a block diagram illustrating an example computer system 200 including the optimization client 199 according to some embodiments.

In some embodiments, the computer system 200 may include a special-purpose computer system that is programmed to perform one or more steps of a method 300 described below with reference to FIGS. 3A and 3B. In some embodiments, the computer system 200 may include a special-purpose computer system that is programmed to perform one or more steps of a method 400 described below with reference to FIGS. 4A and 4B.

In some embodiments, the computer system 200 may be an onboard vehicle computer of the DSRC-enabled vehicle 123.

In some embodiments, the computer system 200 may include an electronic control unit, head unit or some other processor-based computing device of the DSRC-enabled vehicle 123.

The computer system 200 may include one or more of the following elements according to some examples: the optimization client 199; the processor 225A (referred to herein as the processor 225"); the memory 227A (referred to herein as the memory 227"); the communication unit 145A (referred to herein as the communication unit 145"); the DSRC-compliant GPS unit 170A (referred to herein as the "DSRC-compliant GPS unit 170"); and one or more ADAS systems 280. These components of the computer system 200 are communicatively coupled by the bus 220A (referred to herein as the "bus 220").

In the illustrated embodiment, the processor 225 is communicatively coupled to the bus 220 via a signal line 238. The memory 227 is communicatively coupled to the bus 220 via a signal line 244. The communication unit 145 is communicatively coupled to the bus 220 via a signal line 246. The DSRC-compliant GPS unit 170 is communicatively coupled to the bus 220 via a signal line 249. The one or more ADAS systems 280 is communicatively coupled to the bus 220 via a signal line 239.

These elements of the computer system 200 where described above with reference to FIG. 1A-1D, and there descriptions will not be repeated here: the optimization client 199; the communication unit 145; and the DSRC-compliant GPS unit 170.

The one or more ADAS systems 280 include the one or more ADAS systems of the ADAS system set 180.

The processor 225 includes an arithmetic logic unit, a microprocessor, a general-purpose controller, or some other processor array to perform computations and provide electronic signals necessary to provide the functionality of the computer system 200. The processor 225 processes data signals and may include various computing architectures including a complex instruction set computer (CISC) architecture, a reduced instruction set computer (RISC) architecture, or an architecture implementing a combination of instruction sets. The computer system 200 may include one or more processors 225. Other processors, operating systems, sensors, displays, and physical configurations may be possible. In some embodiments, the one or more processors 225 are an element of an onboard vehicle computer or electronic control unit of the computer system 200.

The memory 227 is a non-transitory storage medium that stores instructions or data that may accessed and executed by the processor 225. The instructions or data may include code for performing the techniques described herein. The memory 227 may be a dynamic random access memory (DRAM) device, a static random access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 227 may be reserved for use as a buffer or virtual random access memory (virtual RAM). The computer system 200 may include one or more memories 227.

The memory 227 may store one or more of the following elements: the optimization client 199; the PSM data structure 196; the PSM data 195; the vehicle location data 184; the vehicle time data 186; the one or more ADAS identifiers 188; the optimization query 182; and the optimization data 160.

The memory 227 may store any of the data, information or wireless messages described above with reference to FIGS. 1A, 1B, 1C and 1D or below with reference to FIGS. 2B, 3A, 3B, 4A and 4B. The memory 227 may store any data needed for the computer system 200 to provide its functionality.

In the illustrated embodiment shown in FIG. 2A, the optimization client 199 includes a communication module 202A (referred to herein as a "communication module 202"), a manager module 204, and a modifier module 206.

The communication module 202 can be software including routines for handling communications between the optimization client 199 and other components of the computer system 200. In some embodiments, the communication module 202 can be a set of instructions executable by the processor 225 to provide the functionality described below for handling communications between the optimization client 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 145, to and from one or more elements of the operating environment 100 (see, e.g., FIG. 1A) and one or more elements of the operating environment 101 (see, e.g., FIG. 1C). For example, the communication module 202 receives or transmits, via the communication unit 145, any of the data stored in the memory 227 or messages described herein. The communication module 202 may send or receive any of the data or messages described herein via the communication unit 145.

In some embodiments, the communication module 202 receives data from components of the computer system 200 and stores the data in the memory 227 (or a buffer or cache of the computer system 200). For example, the communication module 202 receives any of the data described above with reference to the memory 227 from the communication unit 145 (via the network 105) and stores this data in the memory 227 (or a buffer or cache of the computer system 200).

In some embodiments, the communication module 202 may handle communications between components of the optimization client 199.

The manager module 204 can be software including receiving PSM messages from the communication module 202 (which is received by the communication module 202 from the communication unit 145), extracting the PSM data 195 from the PSM messages and forming the PSM data structure 196. In some embodiments, the manager module 204 can be a set of instructions executable by the processor 225 to cause the communication unit 145 to transmit wireless messages including the PSM data 195 or the PSM data structure 196 to the server 107 via the network 105.

In some embodiments, the manager module 204 can be a set of instructions executable by the processor 225 to cause the DSRC-compliant GPS unit 170 to retrieve GPS data describing the current location of the computer system 200 and the current day of the week and time of the day, and then storing the GPS data separately in the memory 227 as the vehicle location data 184 and the vehicle time data 186.

In some embodiments, the manager module 204 can be a set of instructions executable by the processor 225 to call the one or more ADAS systems 280 of the computer system 200 and receive one or more ADAS identifiers 188 for the one or more ADAS systems 280 which are then stored in the memory 227.

In some embodiments, the manager module 204 can be a set of instructions executable by the processor 225 to build the optimization query 182 based on the vehicle location data, the vehicle time data 186 and the one or more ADAS identifiers 188, then cooperating with the communication module 202 to cause the communication unit to transmit the optimization query 182 to the server 107 via the network 105.

In some embodiments, the manager module 204 can be stored in the memory 227 of the computer system 200 and can be accessible and executable by the processor 225. The manager module 204 may be adapted for cooperation and communication with the processor 225 and other components of the computer system 200 via signal line 224.

The modifier module 206 can be software including routines for receiving the optimization data 160 from the communication module 202 and modifying the settings for the one or more ADAS parameter data 177 of the one or more ADAS systems 280 based on the optimization data 160, thereby modifying the motion profile of a DSRC-enabled vehicle 123 to be consistent with the characteristic behavior data 192 for the particular time of day, day of week and geographic location described by the vehicle location data 184 and the vehicle time data 186 included in the optimization query 182.

In some embodiments, the modifier module 206 can be stored in the memory 227 of the computer system 200 and can be accessible and executable by the processor 225. The modifier module 206 may be adapted for cooperation and communication with the processor 225 and other components of the computer system 200 via signal line 226.

Referring now to FIG. 2B, depicted is a block diagram illustrating an example computer system 299 including the optimization system 197 according to some embodiments.

In some embodiments, the computer system 299 may include a special-purpose computer system that is programmed to perform one or more steps of a method 300 described below with reference to FIGS. 3A and 3B. In some embodiments, the computer system 299 may include a special-purpose computer system that is programmed to perform one or more steps of a method 400 described below with reference to FIGS. 4A and 4B.

In some embodiments, the computer system 299 may be an element of the server 107 described herein with reference to one or more of FIGS. 1A, 1B, 1C, 1D, 3A, 3B, 4A and 4B.

The computer system 299 may include one or more of the following elements according to some examples: the optimization system 197; the processor 225B (referred to herein as the processor 225"); the memory 227B (referred to herein as the memory 227"); and the communication unit 145B (referred to herein as the communication unit 145"). These components of the computer system 299 are communicatively coupled by the bus 220B (referred to herein as the "bus 220").

In the illustrated embodiment, the processor 225 is communicatively coupled to the bus 220 via a signal line 259. The memory 227 is communicatively coupled to the bus 220 via a signal line 263. The communication unit 145 is communicatively coupled to the bus 220 via a signal line 261.

These elements of the computer system 299 where described above with reference to FIG. 1A-1D, and there descriptions will not be repeated here: the optimization system 197; and the communication unit 145. The processor 225 and the memory 227 depicted in FIG. 2B are similar to those described above for FIG. 2A, and so, there descriptions will not be repeated here.

The memory 227 may store one or more of the following elements: the optimization system 197; the aggregated PSM data structure 190; one or more instances of PSM data 195; one or more instances of characteristic behavior data 192 (and optionally any associates between this characteristic behavior data 192 and the electronic roadway map 194); the characteristic behavior data structure; the electronic roadway map 194; the ADAS parameter data structure 179; the ADAS parameter data 177; the optimization query 182; and the optimization data 160.

The memory 227 may store any of the data, information or wireless messages described above with reference to FIGS. 1A, 1B, 1C and 1D or below with reference to FIGS. 2B, 3A, 3B, 4A and 4B. The memory 227 may store any data needed for the computer system 299 to provide its functionality.

In the illustrated embodiment shown in FIG. 2B, the optimization system 197 includes a communication module 202B (referred to herein as a "communication module 202"), a manager module 204, and a modifier module 206.

The communication module 202 can be software including routines for handling communications between the optimization system 197 and other components of the computer system 299. In some embodiments, the communication module 202 can be a set of instructions executable by the processor 225 to provide the functionality described below for handling communications between the optimization system 197 and other components of the computer system 299. In some embodiments, the communication module 202 can be stored in the memory 227 of the computer system 299 and can be accessible and executable by the processor 225. The communication module 202 may be adapted for cooperation and communication with the processor 225 and other components of the computer system 299 via signal line 251.

The communication module 202 sends and receives data, via the communication unit 145, to and from one or more elements of the operating environment 100 (see, e.g., FIG. 1A) and one or more elements of the operating environment 101 (see, e.g., FIG. 1C). For example, the communication module 202 receives or transmits, via the communication unit 145, any of the data stored in the memory 227 or messages described herein. The communication module 202 may send or receive any of the data or messages described herein via the communication unit 145.

In some embodiments, the communication module 202 receives data from components of the computer system 299 and stores the data in the memory 227 (or a buffer or cache of the computer system 299). For example, the communication module 202 receives any of the data described above with reference to the memory 227 from the communication unit 145 (via the network 105) and stores this data in the memory 227 (or a buffer or cache of the computer system 299).

In some embodiments, the communication module 202 may handle communications between components of the optimization system 197.

The aggregation module 208 can be software including receiving wireless messages including PSM data 195 (or PSM data structures 196) from the communication module 202 (which is received by the communication module 202 from the communication unit 145), extracting the PSM data 195 from these messages and forming the aggregated PSM data structure 190. In some embodiments, the aggregation module 208 aggregates the PSM data 195 from one or more DSRC-enabled vehicles 123 to create or modify the aggregated PSM data structure 190. The modification may include one or more of: (1) increasing the size of the aggregated PSM data structure 190 (e.g., by adding new instances of PSM data 195 describing pedestrian behavior for one or more of (a) a new location and (b) a new day of the week and time of the day for existing locations); and (2) updating the aggregated PSM data structure 190 for an existing location at a particular day of the week and time of the day by adding a new PSM data entry to the aggregated PSM data structure 190 for this existing location (in some embodiments this does not replace prior entries of PSM data for this existing location, but instead adds to the overall sample size for this existing location).

In some embodiments, the aggregation module 208 can be stored in the memory 227 of the computer system 299 and can be accessible and executable by the processor 225. The aggregation module 208 may be adapted for cooperation and communication with the processor 225 and other components of the computer system 299 via signal line 253.

The behavior module 210 can be software including routines for analyzing aggregated PSM data structure 190 to determine characteristic behavior data 192 that describes the characteristic behavior of pedestrians at different geographic locations for different days of the week and times of the day. In this way, characteristic behavior data 192 is created by the behavior module 210 based on the PSM data 195 included in the aggregated PSM data structure 190.

In some embodiments, the behavior module 210 can be software including routines for associating the characteristic behavior data 192 with an electronic roadway map 194 that includes the same geographic locations characterized by the characteristic behavior data 192. This association may form an characteristic behavior data structure, which optionally may be an element of the aggregated PSM data structure 190. In some embodiments, the characteristic behavior data 192 is stored in the electronic roadway map 194 for each of the geographic locations described by the characteristic behavior data 192, and this may optionally form the characteristic behavior data structure.

In some embodiments, the behavior module 210 can be stored in the memory 227 of the computer system 299 and can be accessible and executable by the processor 225. The behavior module 210 may be adapted for cooperation and communication with the processor 225 and other components of the computer system 299 via signal line 255.

The optimization module 212 can be software including routines for: (1) analyzing the optimization query 182 to determine the current time of day, day of week and geographic location of the DSRC-enabled vehicle 123; (2) retrieving the characteristic behavior data 192 for this particular time of day, day of week and geographic location of the vehicle; (3) querying the ADAS parameter data structure 179 using the one or more ADAS identifiers 188 included in the optimization query 182 to retrieve the ADAS parameter data 177 corresponding to the one or more ADAS identifiers 188 included in the optimization query 182; (4) determining a motion profile which is safe based on the characteristic behavior data 192 (i.e., consistent with the typical pedestrian behavior described by the characteristic behavior data 192) for this particular location at this time of day and day of week; (5) determining optimization data 160 which describes modifications for the settings for the ADAS parameters for the one or more ADAS systems 280 of the DSRC-enabled vehicle 123 that will cause the one or more ADAS systems 280 to operate the DSRC-enabled vehicle 123 with the motion profile that is determined by the optimization module 212 to be consistent with the characteristic behavior data 292 for this particular location at this time of day and day of week; and (6) causing the communication unit 145 of the server 107 to transmit a response message to the DSRC-enabled vehicle 123 via the network 105. The response message includes the optimization data 160. In this way, characteristic behavior data 192 is created by the behavior module 210 based on the PSM data 195 included in the aggregated PSM data structure 190.

In some embodiments, the optimization module 212 can be stored in the memory 227 of the computer system 299 and can be accessible and executable by the processor 225. The optimization module 212 may be adapted for cooperation and communication with the processor 225 and other components of the computer system 299 via signal line 257.

Example Methods

Figure 3A:
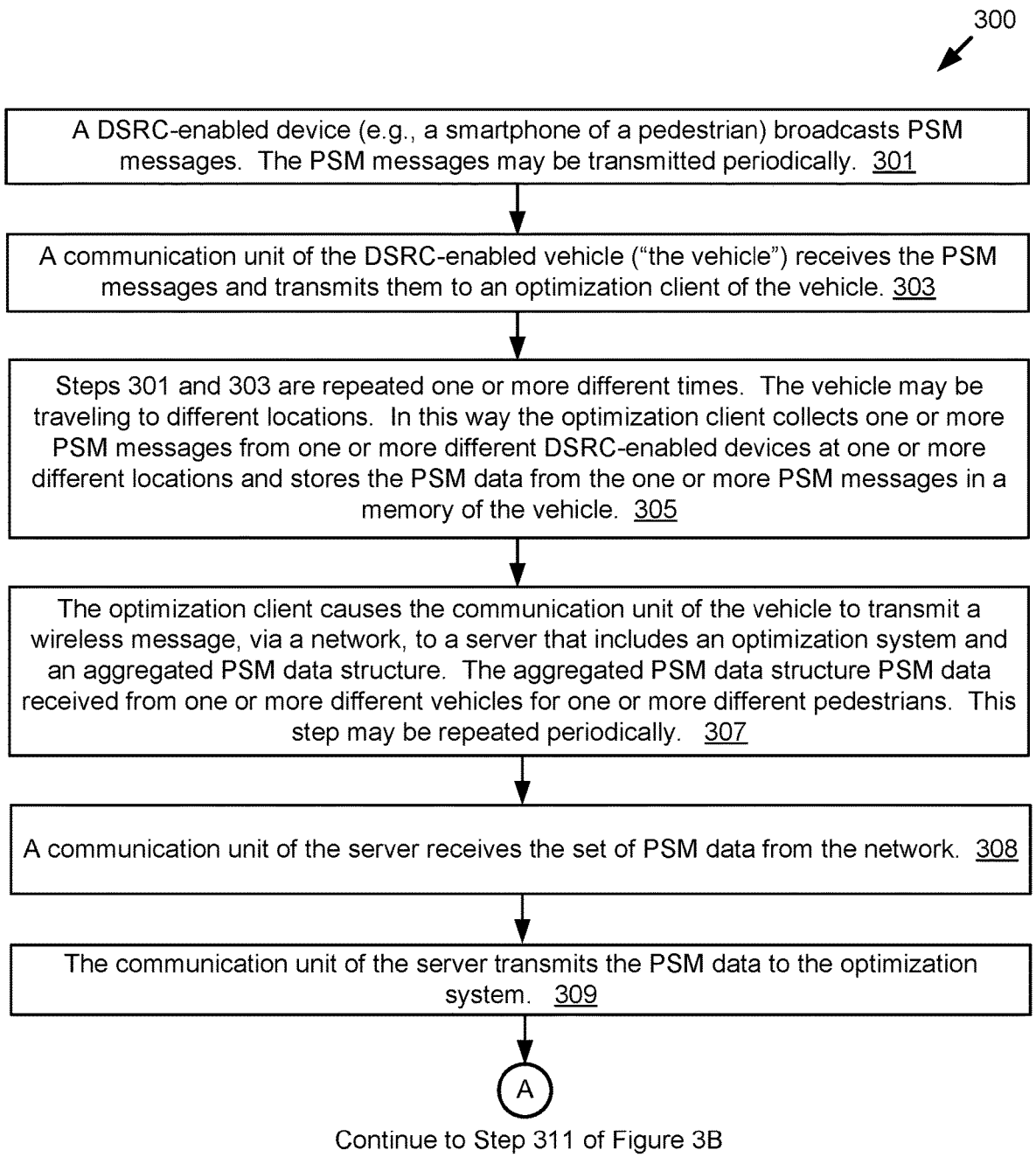
FIGS. 3A and 3B are an example flow diagram of a method for determining characteristic behavior data for one or more geographic locations and associating this characteristic behavior data with an electronic roadway map that includes the one or more geographic locations according to some embodiments.
Figure 3B:
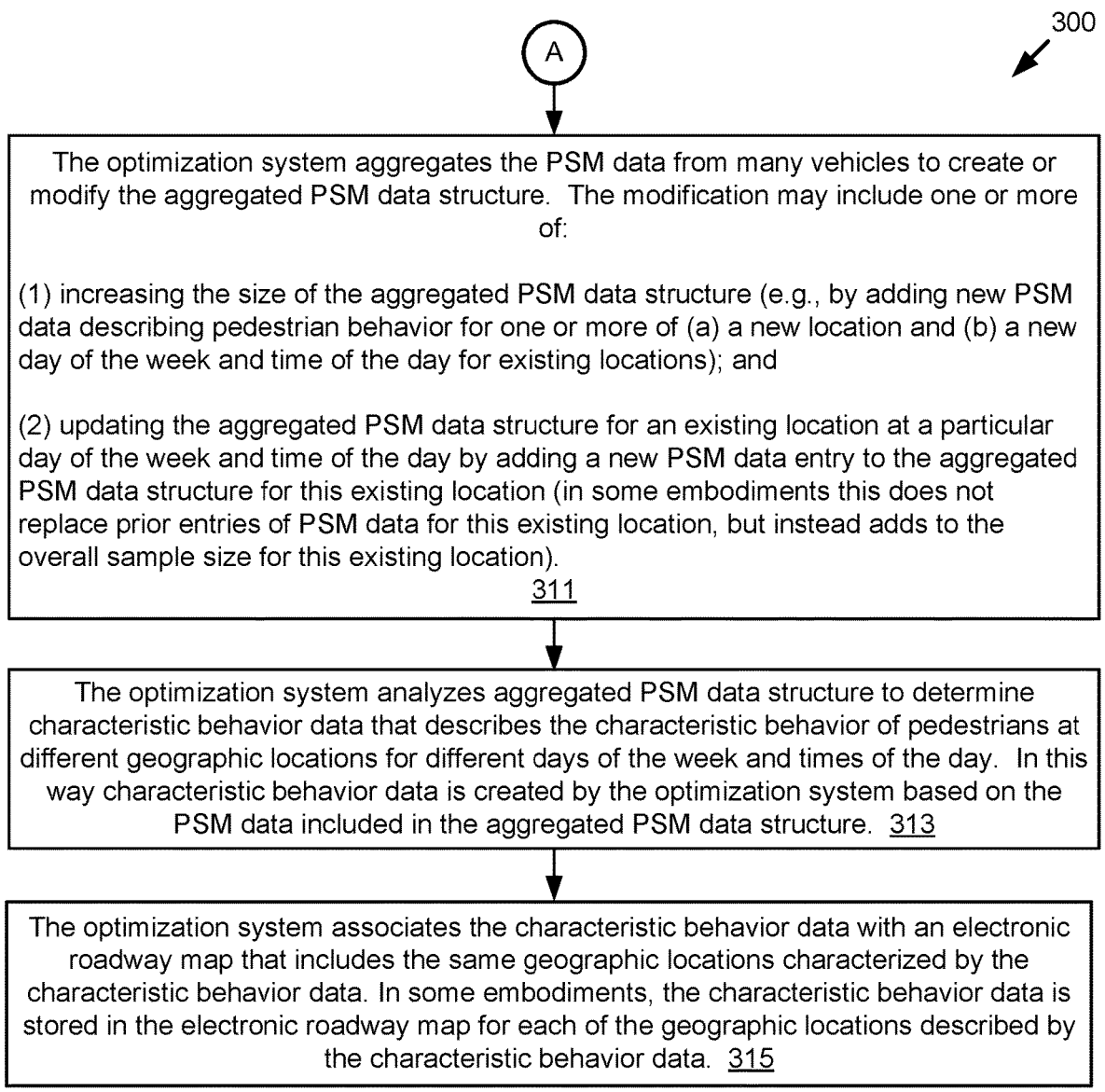

Referring now to FIGS. 3A and 3B, depicted is an example flow diagram of a method 300 for determining characteristic behavior data for one or more geographic locations and associating this characteristic behavior data with an electronic roadway map that includes the one or more geographic locations according to some embodiments. One or more of the steps described herein for the method 300 may be executed by one or more of the computer system 200 and the computer system 299.

Referring now to FIG. 3A. At step 301, a DSRC-enabled device (e.g., a smartphone of a pedestrian) broadcasts one or more PSM messages. The PSM messages may be transmitted periodically.

At step 303, a communication unit of the DSRC-enabled vehicle receives the PSM messages and transmits them to an optimization client of the DSRC-enabled vehicle.

At step 305, steps 301 and 303 are repeated one or more different times. The vehicle may be traveling to different locations. In this way the optimization client collects one or more PSM messages from one or more different DSRC-enabled devices at one or more different locations and stores the PSM data from the one or more PSM messages in a memory of the DSRC-enabled vehicle.

At step 307, the optimization client causes the communication unit of the DSRC-enabled vehicle to transmit a wireless message, via a network, to a server that includes an optimization system and an aggregated PSM data structure. The aggregated PSM data structure PSM data received from one or more different vehicles for one or more different pedestrians. This step may be repeated periodically.

At step 308, a communication unit of the server receives the set of PSM data from the network.

At step 309, the communication unit of the server transmits the PSM data to the optimization system.

Referring now to FIG. 3B. At step 311, the optimization system aggregates the PSM data from many vehicles to create or modify the aggregated PSM data structure. The modification may include one or more of: (1) increasing the size of the aggregated PSM data structure (e.g., by adding new PSM describing pedestrian behavior for one or more of (a) a new location and (b) a new day of the week and time of the day for existing locations); and (2) updating the aggregated PSM data structure for an existing location at a particular day of the week and time of the day by adding a new PSM data entry to the aggregated PSM data structure for this existing location (in some embodiments this does not replace prior entries of PSM data for this existing location, but instead adds to the overall sample size for this existing location).

At step 313, the optimization system analyzes the aggregated PSM data structure to determine characteristic behavior data that describes the characteristic behavior of pedestrians at different geographic locations for different days of the week and times of the day. In this way characteristic behavior data is created by the optimization system based on the PSM data included in the aggregated PSM data structure.

At step 315, the optimization system associates the characteristic behavior data with an electronic roadway map that includes the same geographic locations characterized by the characteristic behavior data. In some embodiments, the characteristic behavior data is stored in the electronic roadway map for each of the geographic locations described by the characteristic behavior data.

Figure 4A:
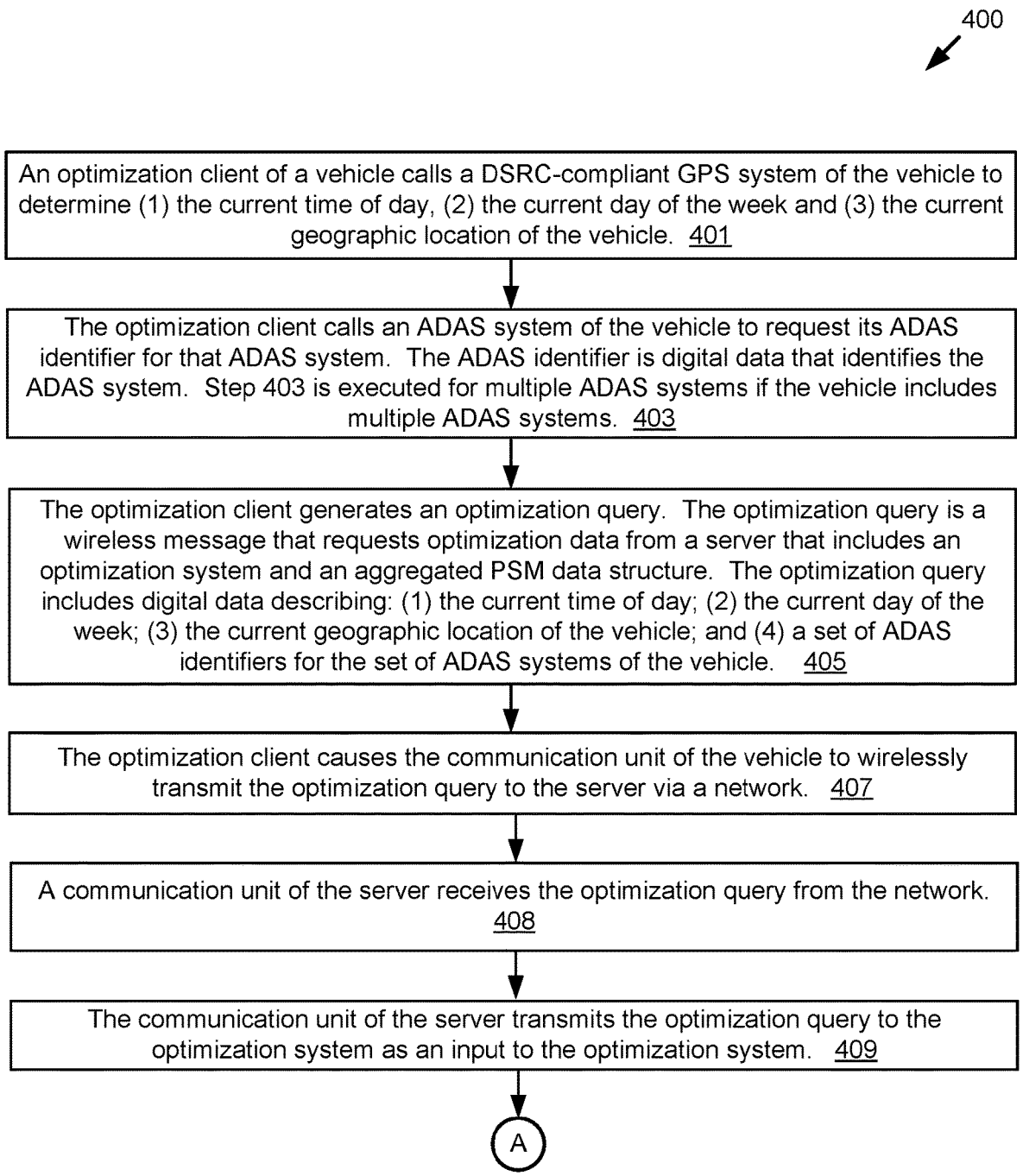
FIGS. 4A and 4B are an example flow diagram of a method for modifying the motion profile of a DSRC-enabled vehicle based on characteristic behavior data according to some embodiments.
Figure 4B:
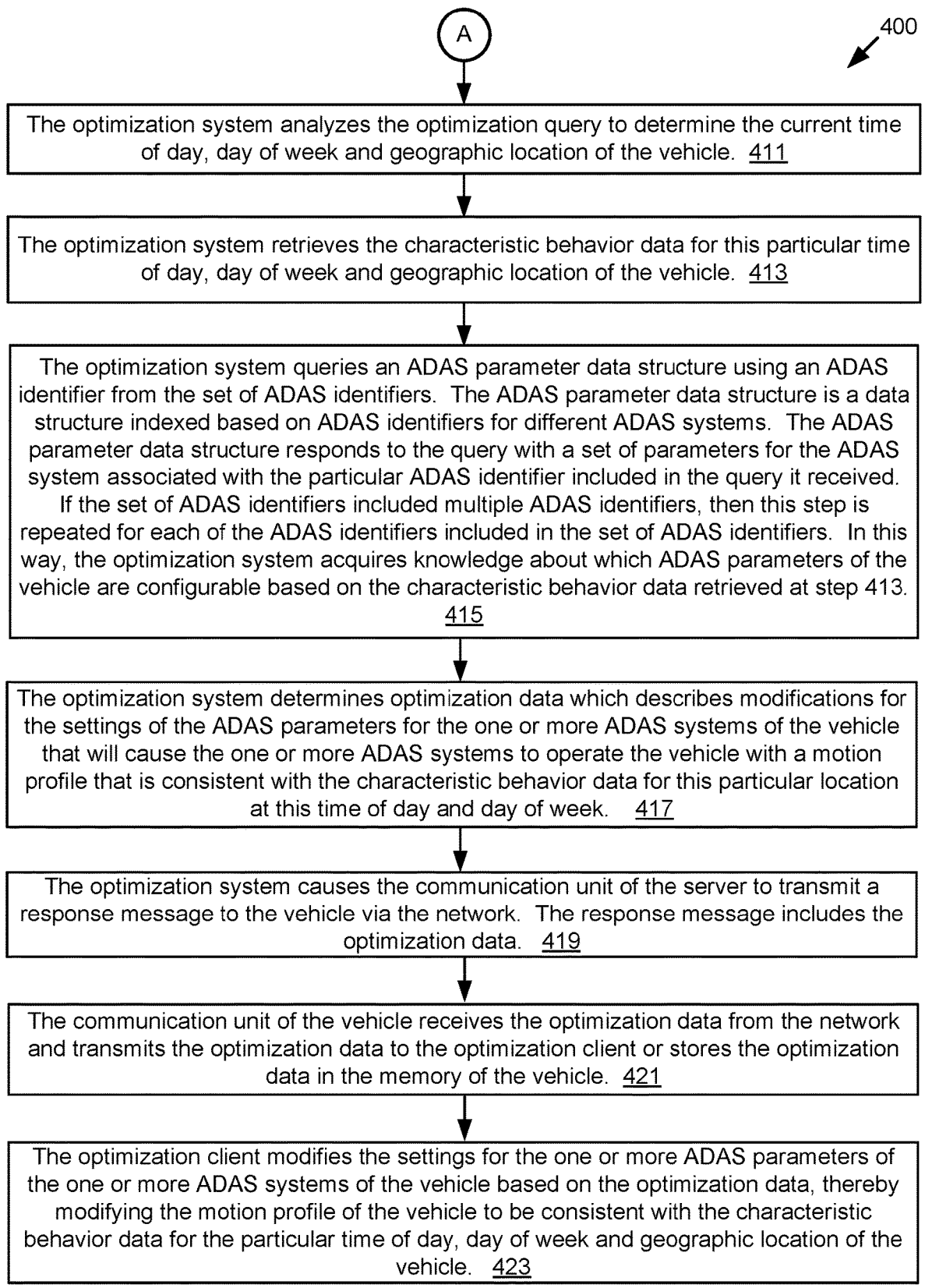

Referring now to FIGS. 4A and 4B, depicted is example flow diagram of a method 400 for modifying the motion profile of a vehicle based on characteristic behavior data according to some embodiments. The vehicle may include one or more of a DSRC-enabled vehicle and an autonomous vehicle operating at one or more of Level 1, Level 2, Level 3, Level 4 and Level 5. In some embodiments, the vehicle is a HAV.

Referring to FIG. 4A. At step 401, an optimization client of the vehicle calls a DSRC-compliant GPS system of the vehicle to determine (1) the current time of day, (2) the current day of the week and (3) the current geographic location of the vehicle.

At step 403, the optimization client calls an ADAS system of the vehicle to request its ADAS identifier for that ADAS system. The ADAS identifier is digital data that identifies the ADAS system. Step 403 is executed for multiple ADAS systems if the vehicle includes multiple ADAS systems.

At step 405, the optimization client generates an optimization query. The optimization query is a wireless message that requests optimization data from a server that includes an optimization system and an aggregated PSM data structure. The optimization query includes digital data describing: (1) the current time of day; (2) the current day of the week; (3) the current geographic location of the vehicle; and (4) a set of ADAS identifiers for the set of ADAS systems of the vehicle.

At step 407, the optimization client causes the communication unit of the vehicle to wirelessly transmit the optimization query to the server via a network.

At step 408, the optimization client causes the communication unit of the vehicle to wirelessly transmit the optimization query to the server via the network.

At step 409, the communication unit of the server transmits the optimization query to the optimization system as an input to the optimization system.

Referring now to FIG. 4B. At step 411, the optimization system analyzes the optimization query to determine the current time of day, day of week and geographic location of the vehicle.

At step 413, the optimization system retrieves the characteristic behavior data for this particular time of day, day of week and geographic location of the vehicle.

At step 415, the optimization system queries an ADAS parameter data structure using an ADAS identifier from the set of ADAS identifiers. The ADAS parameter data structure is a data structure indexed based on ADAS identifiers for different ADAS systems. The ADAS parameter data structure responds to the query with a set of parameters for the ADAS system associated with the particular ADAS identifier included in the query it received. If the set of ADAS identifiers included multiple ADAS identifiers, then this step is repeated for each of the ADAS identifiers included in the set of ADAS identifiers. In this way, the optimization system acquires knowledge about which ADAS parameters of the vehicle are configurable based on the characteristic behavior data retrieved at step 413.

At step 417, the optimization system determines optimization data which describes modifications for the settings of the ADAS parameters for the one or more ADAS systems of the vehicle that will cause the one or more ADAS systems to operate the vehicle with a motion profile that is consistent with the characteristic behavior data for this particular location at this time of day and day of week. This step may include analyzing the characteristic behavior data to determine a motion profile that is safe for the vehicle based on the typical behavior of pedestrians at this location on this day of the week and at this time of the day.

At step 419, the optimization system causes the communication unit of the server to transmit a response message to the vehicle via the network. The response message includes the optimization data.

At step 421, the communication unit of the vehicle receives the optimization data from the network and transmits the optimization data to the optimization client or stores the optimization data in the memory of the vehicle.

At step 423, the optimization client modifies the settings for the one or more ADAS parameters of the one or more ADAS systems of the vehicle based on the optimization data, thereby modifying the motion profile of the vehicle to be consistent with the characteristic behavior data for the particular time of day, day of week and geographic location of the vehicle.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    receiving, by a first dedicated short range communication (DSRC) chip of a DSRC-enabled vehicle, a pedestrian safety message (a PSM message) including pedestrian safety message data (PSM data) describing a relationship of a pedestrian to the DSRC-enabled vehicle in a roadway infrastructure, wherein the PSM message is broadcast by a DSRC-enabled device and wherein the PSM data includes (a) path history data that is based on global positioning system (GPS) data and (b) a path prediction for the pedestrian over a specified time frame or distance based on a trajectory indicated by the path history data;
    wirelessly transmitting, by the DSRC-enabled vehicle, the PSM data and an advanced driver assistance system identifier (ADAS identifier) that identifies an advanced driver assistance system (an ADAS system) to a server, wherein the server determines characteristic behavior data based on the PSM data;
    receiving, from the server, optimization data describing one or more modifications for the ADAS system, wherein the optimization data is determined based on the characteristic behavior data; and
    modifying one or more settings of the ADAS system based on the optimization data.

2. The method of claim 1, wherein:
    the server generates aggregated PSM data from the PSM data associated with the DSRC-enabled device and from a set of PSM data associated with a set of DSRC-enabled vehicles, wherein the aggregated PSM data describes the geographic locations and the corresponding times associated with a set of pedestrians; and
    the server generates the optimization data based on the aggregated PSM data.

3. The method of claim 2, wherein the server modifies the aggregated PSM data to include data entries for a new day of a week and a new time of day for the geographic locations described by the aggregated PSM data.

4. The method of claim 1, wherein modifying the one or more settings of the ADAS system causes the DSRC-enabled vehicle to operate based on a motion profile that is consistent with the characteristic behavior data to avoid the pedestrian.

5. The method of claim 1, wherein the DSRC-enabled vehicle is an automated vehicle.

6. The method of claim 1, wherein the DSRC-enabled vehicle is a highly autonomous vehicle that operates at Level 3 or higher.

7. A system comprising:
    a processor and a first dedicated short range communication (DSRC) chip of a DSRC-enabled vehicle communicatively coupled to a non-transitory memory storing executable code which is operable, when executed by the processor, to cause the processor to:
    receive, by the first DSRC chip of the DSRC-enabled vehicle, a pedestrian safety message (a PSM message) including pedestrian safety message data (PSM data) describing a relationship of a pedestrian to the DSRC-enabled vehicle in a roadway infrastructure, wherein the PSM message is broadcast by a DSRC-enabled device and wherein the PSM data includes (a) path history data that is based on global positioning system (GPS) data and (b) a path prediction for the pedestrian over a specified time frame or distance based on a trajectory indicated by the path history data;
    wirelessly transmit, by the DSRC-enabled vehicle, the PSM data and an advanced driver assistance system identifier (ADAS identifier) that identifies an advanced driver assistance system (an ADAS system) to a server, wherein the server determines characteristic behavior data based on the PSM data;
    receiving, from the server, optimization data describing one or more modifications for the ADAS system, wherein the optimization data is determined based on the characteristic behavior data; and
    modifying one or more settings of the ADAS system based on the optimization data.

8. The system of claim 7, wherein the processor is an element of an engine control unit.

9. The system of claim 7, wherein the processor is an element of an onboard vehicle computer system.

10. The system of claim 7, wherein:
the server generates aggregated PSM data from the PSM data associated with the DSRC-enabled device and from a set of PSM data associated with a set of DSRC-enabled vehicles, wherein the aggregated PSM data describes geographic locations and corresponding times associated with a set of pedestrians; and
the server generates the optimization data based on the aggregated PSM data.

11. The system of claim 10, wherein the server modifies the aggregated PSM data to include data entries for a new day of a week and a new time of day for the geographic locations described by the aggregated PSM data.

12. The system of claim 11, wherein the DSRC-enabled vehicle is an automated vehicle.

13. The system of claim 11, wherein the DSRC-enabled vehicle is a highly autonomous vehicle that operates at Level 3 or higher.

14. A computer program product comprising a non-transitory memory of an onboard vehicle computer system of a dedicated short range communication-enabled vehicle (a DSRC-enabled vehicle) storing computer-executable code that, when executed by the onboard vehicle computer system, causes the onboard vehicle computer system to:
receive, by a first DSRC chip of the DSRC-enabled vehicle, a pedestrian safety message (a PSM message) including pedestrian safety message data (PSM data) describing a relationship of a pedestrian to the DSRC-enabled vehicle in a roadway infrastructure, wherein the PSM message is broadcast by a DSRC-enabled device and wherein the PSM data includes (a) path history data that is based on global positioning system (GPS) data and (b) a path prediction for the pedestrian over a specified time frame or distance based on a trajectory indicated by the path history data;
wirelessly transmit, by the DSRC-enabled vehicle, the PSM data and an advanced driver assistance system identifier (ADAS identifier) that identifies an advanced driver assistance system (an ADAS system) to a server, wherein the server determines characteristic behavior data based on the PSM data;
receive, from the server, optimization data describing one or more modifications for the wherein the optimization data is determined based on the characteristic behavior data; and
modify one or more settings of the ADAS system based on the optimization data.

15. The computer program product of claim 14, wherein the DSRC-enabled vehicle is an autonomous vehicle.

16. The computer program product of claim 15, wherein the DSRC-enabled vehicle is a highly autonomous vehicle that operates at Level 3 or higher.

17. The computer program product of claim 14, wherein:
the server generates aggregated PSM data from the PSM data associated with the DSRC-enabled device and from a set of PSM data associated with a set of DSRC-enabled vehicles, wherein the aggregated PSM data describes geographic locations and corresponding times associated with a set of pedestrians; and
the server generates the optimization data based on the aggregated PSM data.

18. The computer program product of claim 17, wherein the server modifies the aggregated PSM data to include data entries for a new day of a week and a new time of day for geographic locations described by the aggregated PSM data.

19. The computer program product of claim 14, wherein modifying the one or more settings of the ADAS system causes the DSRC-enabled vehicle to operate based on a motion profile that is consistent with the characteristic behavior data to avoid the pedestrian.

\* \* \* \* \*